US009838635B2

(12) United States Patent
Gousev et al.

(10) Patent No.: US 9,838,635 B2
(45) Date of Patent: Dec. 5, 2017

(54) FEATURE COMPUTATION IN A SENSOR ELEMENT ARRAY

(71) Applicant: QUALCOMM Incorporated, San Diego, CA (US)

(72) Inventors: Evgeni Petrovich Gousev, Saratoga, CA (US); Alok Govil, Fremont, CA (US); Soo Youn Kim, San Diego, CA (US); Nelson Rasquinha, San Diego, CA (US); Venkat Rangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/862,319

(22) Filed: Sep. 23, 2015

(65) Prior Publication Data

US 2016/0094800 A1    Mar. 31, 2016

Related U.S. Application Data

(60) Provisional application No. 62/058,007, filed on Sep. 30, 2014, provisional application No. 62/058,006, (Continued)

(51) Int. Cl.
*H04N 5/378* (2011.01)
*G06F 1/32* (2006.01)
(Continued)

(52) U.S. Cl.
CPC ........... *H04N 5/378* (2013.01); *G06F 1/3203* (2013.01); *G06K 9/00986* (2013.01); (Continued)

(58) Field of Classification Search
CPC .. H04N 5/378; H04N 5/23241; G06F 1/3203; G06K 9/00986; G06K 9/4619; (Continued)

(56) References Cited

U.S. PATENT DOCUMENTS 5,289,023 A    2/1994   Mead
5,543,590 A    8/1996   Gillespie et al.
(Continued)

FOREIGN PATENT DOCUMENTS

CN    102663409 A    9/2012
DE    102006023611 A1    11/2007
(Continued)

OTHER PUBLICATIONS

Delbruck, T., et al., "Activity-Driven, Event-Based Vision Sensors," Proceedings of 2010 IEEE International Symposium on Circuits and Systems (ISCAS), 2010, 4 pages.
(Continued)

*Primary Examiner* — Nhan T Tran
(74) *Attorney, Agent, or Firm* — Kilpatrick Townsend & Stockton, LLP

(57) ABSTRACT

Techniques describe computing computer vision (CV) features based on sensor readings from a sensor and detecting macro-features based on the CV features. The sensor may include a sensor element array that includes a plurality of sensor elements. The sensor may also include in-pixel circuitry coupled to the sensor elements, peripheral circuitry and/or a dedicated microprocessor coupled to the sensor element array. The in-pixel circuitry, the peripheral circuitry or the dedicated microprocessor may include computation structures configured to perform analog or digital operations representative of a multi-pixel computation for a sensor element (or block of sensor elements), based on sensor readings generated by neighboring sensor elements in proximity to the sensor element, and to generate CV features. The dedicated microprocessor may process the CV features and detect macro-features. Furthermore, in certain embodiments, the dedicated microprocessor may be coupled to a
(Continued)

second microprocessor through a wired or wireless interface.

27 Claims, 23 Drawing Sheets

Related U.S. Application Data filed on Sep. 30, 2014, provisional application No. 62/058,009, filed on Sep. 30, 2014.

(51) Int. Cl.
| | | |
|---|---|---|
| G06K 9/00 | (2006.01) | |
| H04N 5/232 | (2006.01) | |
| G06K 9/46 | (2006.01) | |
| G06K 9/60 | (2006.01) | |

(52) U.S. Cl.
CPC ......... *G06K 9/4619* (2013.01); *G06K 9/4647* (2013.01); *G06K 9/605* (2013.01); *H04N 5/23241* (2013.01); *G06K 2009/4666* (2013.01)

(58) Field of Classification Search
CPC .. G06K 9/4647; G06K 9/605; H01L 27/1461; H01L 27/14643
See application file for complete search history.

(56) References Cited

U.S. PATENT DOCUMENTS

| | | | |
|---|---|---|---|
| 6,011,257 | A | 1/2000 | Endoh |
| 6,459,509 | B1 | 10/2002 | Maciey et al. |
| 7,038,185 | B1 | 5/2006 | Tumblin et al. |
| 7,151,844 | B2 | 12/2006 | Stevenson et al. |
| 8,203,440 | B2 | 6/2012 | Schofield et al. |
| 8,462,996 | B2 | 6/2013 | Moon et al. |
| 8,902,971 | B2 | 12/2014 | Pace et al. |
| 8,928,793 | B2 | 1/2015 | McMahon |
| 9,332,239 | B2 | 5/2016 | Cote et al. |
| 2001/0028405 | A1 | 10/2001 | Kondo et al. |
| 2002/0012459 | A1 | 1/2002 | Oh |
| 2002/0100862 | A1 | 8/2002 | Liu |
| 2004/0155175 | A1 | 8/2004 | McNulty |
| 2009/0020612 | A1 | 1/2009 | Drzymala et al. |
| 2009/0060383 | A1 | 3/2009 | Li et al. |
| 2009/0157707 | A1 | 6/2009 | Ito et al. |
| 2010/0182468 | A1 | 7/2010 | Posch et al. |
| 2010/0316254 | A1* | 12/2010 | Kirsch ............... H04N 5/23219 382/103 |
| 2011/0128428 | A1 | 6/2011 | Takatoku et al. |
| 2011/0298755 | A1 | 12/2011 | Ni |
| 2012/0138774 | A1 | 6/2012 | Kelly et al. |
| 2012/0313960 | A1 | 12/2012 | Segawa et al. |
| 2013/0054505 | A1 | 2/2013 | Ross et al. |
| 2013/0121590 | A1 | 5/2013 | Yamanaka et al. |
| 2013/0176552 | A1 | 7/2013 | Brown et al. |
| 2013/0229508 | A1 | 9/2013 | Li et al. |
| 2014/0003663 | A1 | 1/2014 | Li et al. |
| 2014/0118592 | A1* | 5/2014 | Yoon ................... H04N 5/23251 348/308 |
| 2014/0125799 | A1 | 5/2014 | Bos et al. |
| 2014/0149754 | A1 | 5/2014 | Silva et al. |
| 2014/0169663 | A1 | 6/2014 | Han et al. |
| 2014/0192066 | A1 | 7/2014 | Savransky et al. |
| 2014/0204238 | A1* | 7/2014 | Cao ........................ H04N 5/232 348/222.1 |
| 2014/0319325 | A1 | 10/2014 | Kawahito et al. |
| 2014/0320666 | A1 | 10/2014 | Badawy et al. |
| 2014/0363049 | A1 | 12/2014 | Benosman et al. |
| 2014/0368423 | A1 | 12/2014 | Brenckle et al. |
| 2014/0368626 | A1 | 12/2014 | John et al. |
| 2014/0368712 | A1 | 12/2014 | Park et al. |
| 2015/0036942 | A1 | 2/2015 | Smirnov et al. |
| 2015/0311977 | A1 | 10/2015 | Jovicic et al. |
| 2015/0358525 | A1 | 12/2015 | Lord |
| 2016/0091946 | A1 | 3/2016 | Govil et al. |
| 2016/0092735 | A1 | 3/2016 | Govil |
| 2016/0094814 | A1 | 3/2016 | Gousev |
| 2016/0110603 | A1 | 4/2016 | Govil et al. |
| 2016/0117564 | A1 | 4/2016 | Govil et al. |
| 2016/0241338 | A1 | 8/2016 | Ganick et al. |
| 2016/0275348 | A1 | 9/2016 | Slaby et al. |
| 2016/0283789 | A1 | 9/2016 | Slaby et al. |
| 2016/0335495 | A1 | 11/2016 | Kim et al. |
| 2017/0032216 | A1 | 2/2017 | Govil et al. |
| 2017/0064211 | A1* | 3/2017 | Omid-Zohoor ........ H04N 5/378 |
| 2017/0091550 | A1 | 3/2017 | Feng et al. |
| 2017/0116478 | A1 | 4/2017 | Gousev et al. |
| 2017/0132466 | A1 | 5/2017 | Gousev et al. |
| 2017/0161579 | A1 | 6/2017 | Gousev et al. |

FOREIGN PATENT DOCUMENTS

| | | |
|---|---|---|
| DE | 102008052930 A1 | 4/2010 |
| EP | 2665257 A1 | 11/2013 |
| EP | 2709066 A1 | 3/2014 |
| EP | 2757769 A1 | 7/2014 |
| JP | 2008131407 A | 6/2008 |
| JP | 2013003787 A | 1/2013 |
| WO | WO-2012093381 A1 | 7/2012 |
| WO | WO-2014015194 A2 | 1/2014 |
| WO | 2015148209 A1 | 10/2015 |

OTHER PUBLICATIONS

Etienne-Cummings, R., et al., "A Programmable Focal-Plane MIMD Image Processor Chip", IEEE Journal of Solid-State Circuits, Jan. 2001, vol. 36, No. 1, pp. 64-73.

Hsiao, P.Y., et al., "A Novel CMOS Imager with 2-Dimensional Binarization and Edge Detection for Highly Integrated Imaging Systems," Digest of Technical Papers. International Conference on Consumer Electronics, 2006, pp. 71-72.

Lahdenoja, O., et al., "A Massively Parallel Algorithm for Local Binary Pattern based Face Recognition", IEEE, ISCAS 2006, pp. 3730-3733.

Laiho, M., et al., "Dedicated Hardware for Parallel Extraction of Local Binary Pattern Feature Vectors", 2005 9th International Workshop on Cellular Neural Networks and Their Applications, IEEE, May 2005, pp. 27-30.

Pierzchala, E., et al., "High Speed Field Programmable Analog Array Architecture Design", Analogix Corporation, Feb. 1994, 61 pages.

Poikonen, J., et al., "MIPA4k: A 64×64 Cell Mixed-mode Image Processor Array", ISCAS 2009, IEEE, May 24, 2009, pp. 1927-1930.

Posch, C., et al., "An Asynchronous Time-Based Image Sensor," IEEE International Symposium on Circuits and Systems (ISCAS), 2008, 4 pages.

Qualcomm, "FAST Corners", Sep. 15, 2015, 6 Slides (153289 IDF).

Shi, Y., et al., "Smart Cameras: Fundamentals and Classification," Chapter 2, A.N. Belbachir (Ed.), Springer Science+Business Media, LLC 2010, pp. 19-34.

Stack Overflow, "FAST Detector in every levels on Gaussian Pyramids", matlab, Retrieved from internet, URL:http://stackoverflow.com/questions/24222611/fast-detector-in- every-levels-on-gaussian-pyramids , on Sep. 11, 2015, 2 Pages.

Wikipedia, "Features from accelerated segment test", Retrieved from Internet, URL: https://en.wikipedia.org/wiki/Features_from_accelerated_segment_test#High-speed_test , on Sep. 11, 2015, 6 Pages.

Wyatt, J.L., et al., "The MIT Vision Chip Project: Analog VLSI Systems for Fast Image Acquisition and Early Vision Processing," IEEE International Conference on Robotics and Automation, 1991, vol. 2, pp. 1330-1335.

Yu, H, "FAST Corner detection—Machine Learning for high speed corner detection", Nov. 16, 2010, 60 Slides.

(56) References Cited

OTHER PUBLICATIONS

Anonymous: "OpenCV—Haar Cascades vs. LBP Cascades in Face Detection—Stack Overflow", Stack Overflow, Jan. 9, 2012 (Jan. 9, 2012), XP055230385, Retrieved from the Internet Nov. 23, 2015: URL: http://stackoverflow.com/questions/8791178/haar-cascades-vs-lbp-cascades-in-face-detection.
Butler M., et al., "ROI processing offers opportunities," Vision Systems Design, May 1, 2006 (May 1, 2006), XP055232974, Retrieved from the Internet: URL: http://www.vision-systems.com/articles/print/volume-11/issue-5/features/component-integration/roi-processing-offers-opportunities.html [retrieved on Dec. 2, 2015] the whole document.
Cho J., et al., "FPGA-Based Face Detection System Using Haar Classifiers", Field Programmable Gate Arrays, Feb. 22, 2009-Feb. 24, 2009, pp. 103-112, XP058022870, DOI: 10.1145/1508128.1508144, ISBN: 978-1-60558-410-2.
Choi J., et al., "A 3.4[mu]W CMOS Image Sensor with Embedded Feature-extraction Algorithm for Motion-Triggered Object-of-interest Imaging," Solid-State Circuits Conference Digest of Technical Papers (ISSCC), 2013 IEEE International, IEEE, Feb. 17, 2013 (Feb. 17, 2013), pp. 478-479, XP032350659, DOI: 10.1109/ISSCC.2013.6487822 ISBN: 978-1-4673-4515-6.
Fernandez-Berni J., et al., "Bottom-up Performance Analysis of Focal-Plane Mixed-Signal Hardware for Viola-Jones Early Vision Tasks", International Journal of Circuit Theory and Applications, vol. 43, No. 8, Apr. 16, 2014 (Apr. 16, 2014), pp. 1063-1079, XP055230917, ISSN: 0098-9886, DOI: 10.1002/cta.1996.
Fernandez-Berni J., et al., "Focal-Plane Sensing-Processing: A Power-Efficient Approach for the Implementation of Privacy-Aware Networked Visual Sensors," Sensors, vol. 14, No. 8, Aug. 19, 2014 (Aug. 19, 2014), pp. 15203-15226, XP055230039, DOI: 10.3390/s140815203.
Hartenstein R W., et al., "An Embedded Accelerator for Real World Computing", Proceedings of IFIP International Conference on Very Large Scale Integration, VLSI'97, Aug. 26, 1997 (Aug. 26, 1997), pp. 1-12, XP055234128, Gramado, Brazil the whole document.
Huang D., et al, "Local Binary Patterns and Its Application to Facial Image Analysis: A Surve," IEEE Transactions on Systems, Man, and Cybernetics: Part C:Applications and Reviews, IEEE Service Center, Piscataway, NJ, US, vol. 41, No. 6, Nov. 1, 2011 (Nov. 1, 2011), pp. 765-781, XP011363204, ISSN: 1094-6977, DOI: 10.1109/TSMCC.2011.2118750 abstract sections I, III, V, VI.
International Search Report—PCT/US2015/052070—ISA/EPO—dated Dec. 15, 2015.

Kriss M: "Handbook of Digital Imaging", 2015, Wiley & Sons Ltd. Chichester, West Sussex, XP002751874, ISBN: 978-0-470-51059-9 vol. 1, p. 124-129,133-137, the whole document.
Lahdenoja O., et al., "Extracting Local Binary Patterns with MIPA4k Vision Processor," 12th International Workshop on Cellular Nanoscale Networks and their Applications (CNNA), IEEE, Piscataway, NJ, USA, Feb. 3, 2010 (Feb. 3, 2010), pp. 1-5, XP031648245, ISBN: 978-1-4244-6679-5.
Moloney D., et al., "Myriad 2: Eye of the Computational Vision Storm", Hot Chips, Aug. 12, 2014, XP055230946, Retrieved from the Internet on Nov. 24, 2015: URL: http://www.hotchips.org/wp-content/uploads/hc_archives/hc26/HC26-12-day2-epub/HC26.12-6-HP-ASICs-epub/HC26.12.620-Myriad2-Eye-Moloney-Movidius-provided.pdf.
Muehlfellner P., et al., "Selection, Analysis and Implementation of Image-based Feature Extraction Approaches for a Heterogenous, Modular and FPGA-based Architecture for Camera-based Driver Assistance Systems Master Thesis Embedded and Intelligent Systems", Technical Report, Sep. 1, 2011 (Sep. 1, 2011), XP055232797, Retrieved from the Internet: URL: https://www.diva-portal.org/smash/get/diva2:444576/FULLTEXT01.pdf [retrieved on Dec. 2, 2015] chapter 4.
"Myriad 2 Vision Processor Bringing Computational Imaging and Visual Awareness to Mobile, Wearable, and Embedded Markets Product Brief", Aug. 1, 2014, XP055230944, Retrieved from the Internet on Nov. 24, 2015: URL: http://uploads.movidius.com/1441734401-Myriad-2-product-brief.pdf.
Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.
Yang M., et al., "Comparison of Spike Encoding Schemes in Asynchronous Vision Sensors: Modeling and Design", IEEE, International Symposium on Circuits and Systems (ISCAS), Jun. 1, 2014 (Jun. 1, 2014), pp. 2632-2635, XP032624686, DOI: 10.1109/ISCAS.2014.6865713 [retrieved on Jul. 24, 2014].
Kazemi V., et al., "One Millisecond Face Alignment with an Ensemble of Regression Trees", IEEE Conference on Computer Vision and Pattern Recognition (CVPR), 2014, pp. 1-8.
Trein, J. et al., "Development of a FPGA Based Real-Time Blob Analysis Circuit", ISSC 2007, Derry, Sep. 13-14 (6 pages).
De Marsico M., et al., "FIRME: Face and Iris Recognition for Mobile Engagement", Image and Vision Computing, vol. 32, No. 12, Dec. 2014, pp. 1-13.

* cited by examiner

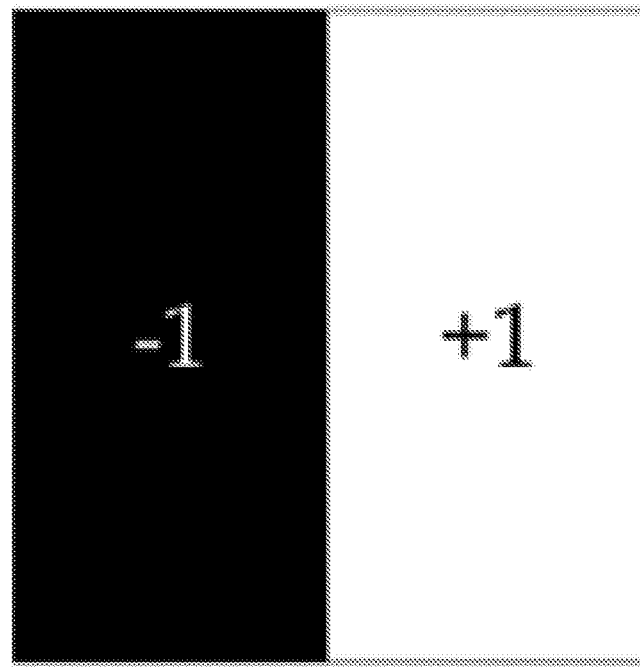
FIG. 15A
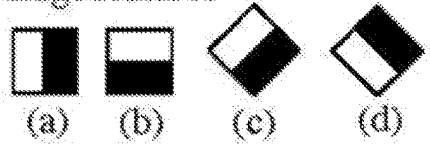
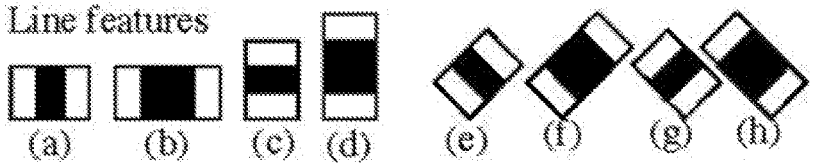
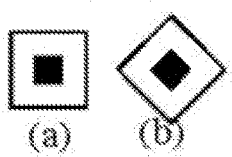
FIG. 15B

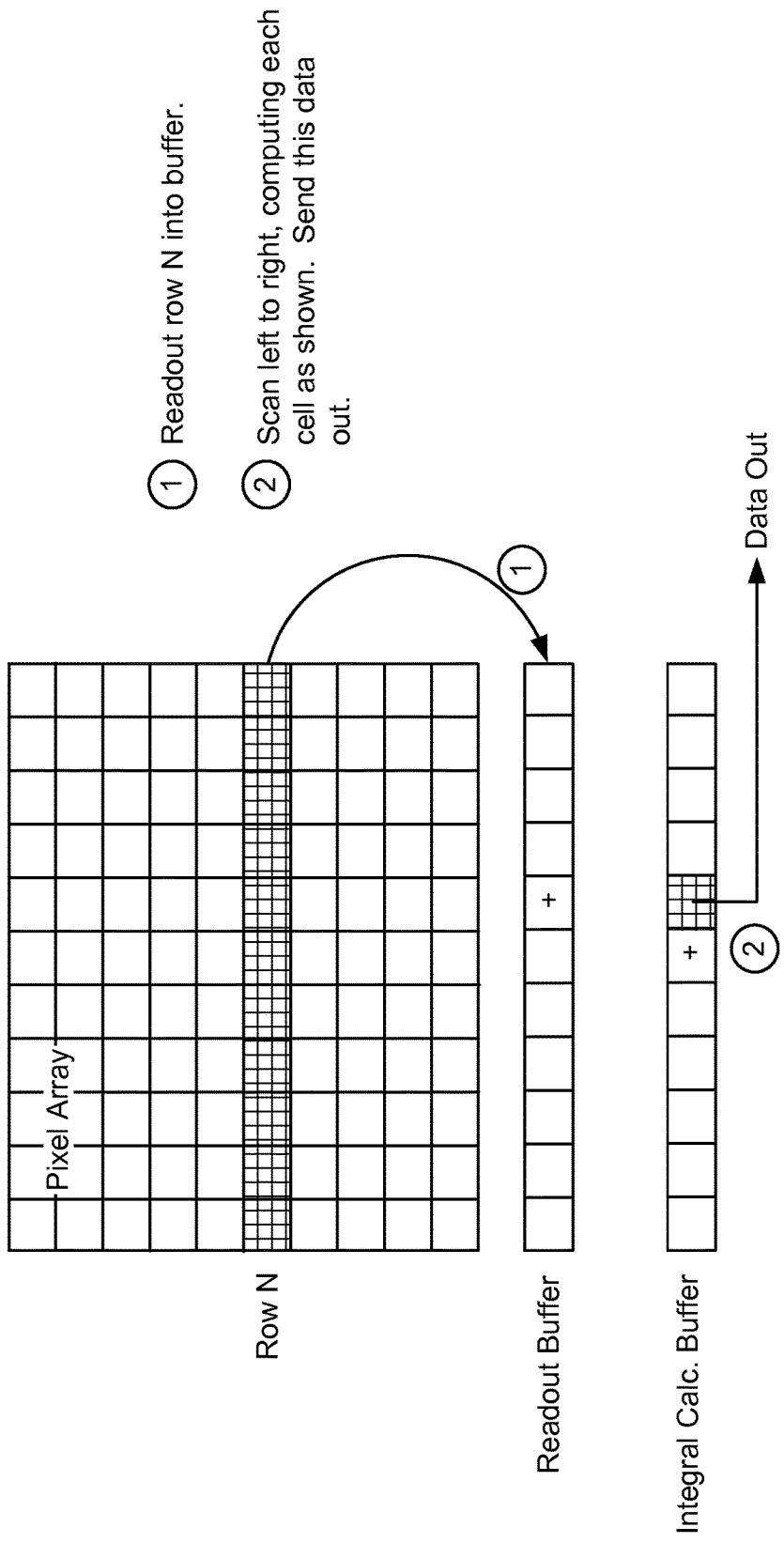

FEATURE COMPUTATION IN A SENSOR ELEMENT ARRAY

CROSS REFERENCE SECTION

This application is a non-provisional application and claims the benefit and priority of U.S. Provisional Application No. 62/058,007, filed on Sep. 30, 2014, titled "FEATURE DETECTION IN A SENSOR ELEMENT ARRAY," U.S. Provisional Application No. 62/058,006, filed on Sep. 30, 2014, titled "COMPUTER VISION USING RECTANGULAR FEATURES AT ARBITRARY ROTATION AND 1-D INTEGRALS," and U.S. Provisional Application No. 62/058,009, filed on Sep. 30, 2014, titled "SCANNING WINDOW IN HARDWARE FOR LOW-POWER OBJECT-DETECTION IN IMAGES," which is herein incorporated by reference in its entirety for all purposes.

BACKGROUND

The present disclosure generally relates to enabling computer vision, and more specifically, improving efficiency for detecting features using computer vision.

Computer vision is a field that includes methods for acquiring, processing, analyzing, and understanding images for use in applications. Traditionally, a processor, coupled to a sensor, acquires image data from a sensor and calculates certain computer vision (CV) features on the information received from the sensor for detecting CV features and consequently objects associated with those features. CV features may include features such as edges, corners, etc. Programs executing on the processor may utilize the detected features in a variety of applications, such as plane-detection, face-detection, smile detection, gesture detection, etc.

Much effort has been made in recent years to enable computing devices to detect features and objects in the field of view of the computing device. Computing devices, such as mobile devices, are designed with sensitivity towards the amount of processing resources and power used by the mobile device and heat dissipation. However, traditionally, detecting features and objects in the field of view of an image captured by a camera using a processor, requires significant processing resources resulting in higher power consumption and lower battery life in computing devices, such as mobile devices.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIGS. 15A and 15B illustrate an existing method for face detection using Haar-like features.

FIG. 19 illustrates computation of 1-D integral images in hardware, in accordance with some implementations.

SUMMARY

Figure 1:
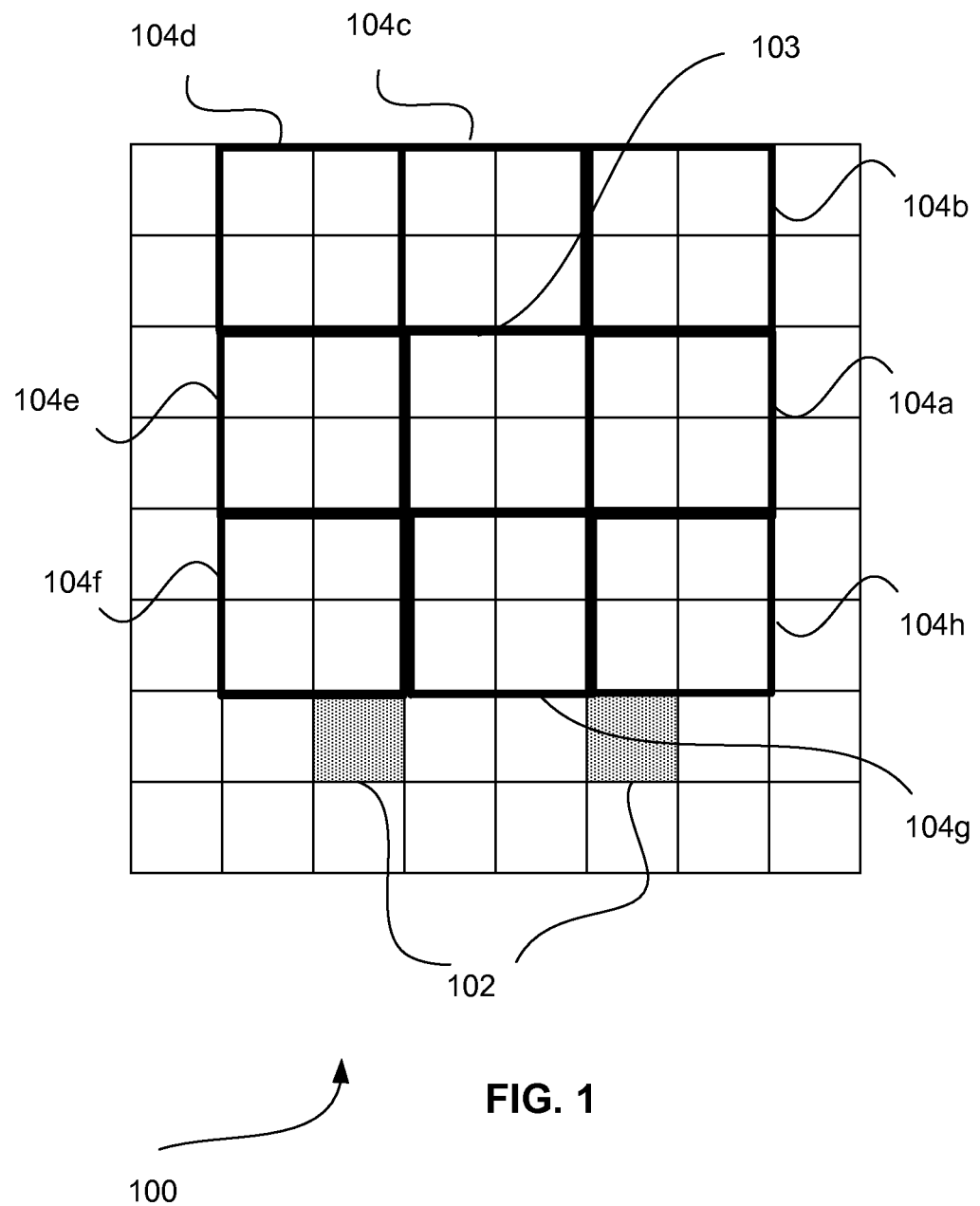
FIG. 1 illustrates an example sensor comprising a plurality of sensor elements arranged in a 2-dimensional array.

The present disclosure generally relates to enabling computer vision, and more specifically, improving efficiency for detecting features using computer vision.

Techniques describe detecting computer vision (CV) features, such as edges, corners etc., by generating computed results based on sensor readings. The sensor apparatus may include a sensor element array that includes a plurality of sensor elements. The sensor elements may be arranged in a 2-dimensional array, such as columns and rows. The sensor elements may be capable of generating sensor reading based on environmental conditions. The sensor apparatus may also include in-pixel circuitry coupled to the sensor element and/or peripheral circuitry coupled to the sensor element array and configured to receive output from the plurality of sensor elements. The in-pixel circuitry and/or the peripheral circuitry may include a computation structure configured to perform an operation representative of a multi-pixel computation for a sensor element, based on sensor readings generated by neighboring sensor elements in proximity to the sensor element. In addition, the sensor apparatus may include a dedicated microprocessor for performing further operations on the detected CV features. For example, the dedicated microprocessor may detect macro-features or reference objects, such as smiles, faces, etc. based on the CV features as disclosed herein.

An example apparatus, such as a vision sensor may include a sensor element array comprising a plurality of sensor elements. The plurality of sensor elements may be arranged along at least a first dimension and a second dimension of the sensor element array. In certain aspects of the disclosure, each of the plurality of sensor elements may be capable of generating a signal based on light incident upon the plurality of sensor elements, the signals corresponding to the plurality of sensor elements representing an image. A dedicated computer vision (CV) computation hardware may be configured to compute a localized CV feature for a block of one or more subject sensor elements based on, at least in part, signals associated with a plurality of neighboring sensor elements in proximity to the block of the one or more subject sensor elements. Furthermore, a dedicated microprocessor may be coupled to the dedicated CV computation hardware, wherein the dedicated microprocessor includes an interface for communication with a second microprocessor. In certain aspects of the disclosure, the block of one or more subject sensor elements for which the localized CV feature is computed is a single subject sensor element. In certain aspects of the disclosure, the dedicated CV computation hardware computes a local binary pattern (LBP) label or a histogram of signed gradients (HSG) feature. As used herein, LBP label and LBP feature, or CV feature more generally, can refer to a CV feature that is computed based on the comparison of a subject pixel with one or more of its neighboring pixel elements. The localized CV features may include one or more of a spot, an edge, or a corner of a line edge.

An example mobile device may comprise the vision sensor and the second microprocessor, wherein the dedicated microprocessor is coupled to the second microprocessor through a wired interface, and wherein the second microprocessor is a higher power processor than the dedicated microprocessor. In some instances, the communication with the second microprocessor through the wired interfaces uses one of serial peripheral interface (SPI), Inter-Integrated Circuit (I2C), or low voltage differential signaling (LVDS).

In certain implementations, a wireless module may be used for communication with the second microprocessor, wherein the wireless module for communication with the second microprocessor is coupled to the dedicated microprocessor using the interface for communication with the second microprocessor. The wireless module may be configured to communicate using a Zigbee (IEEE 802.15.4 standard), Bluetooth®, body area network (IEEE 802.15.6), wireless USB, Wi-Fi (802.11), Z-wave, or IrDA (IR-based communications).

In certain aspects of the disclosure, the vision sensor further includes a two dimensional integration hardware for computing an integral image of at least a part of the image based on at least a subset of the signals corresponding to a window of the image, wherein the dedicated CV computation hardware has access to the computed integral image for computation of combinations, sums, or averages of signals corresponding blocks of sensor elements. The CV computation hardware may be further coupled to cascade classifier hardware configured to detect a presence or an absence of a reference object in the window of the image. In certain instances, the dedicated microprocessor may be configured to receive an indication of the presence of the reference object when the presence of the reference object is detected. In certain aspects of the disclosure, the dedicated microprocessor may be configured to detect a presence or an absence of a reference object in a window of the image based on localized CV features received from the dedicated CV computation hardware.

In certain aspects of the disclosure, the sensor element array and the CV computation hardware are connected without intervening image signal processing circuitry. For example, signals received by the CV computation hardware from the sensor element array may not have undergone one or more of defect correction, white balancing, color balancing, autofocus, lens roll off, demosaicing, debayering, and/or image sharpening.

Aspects of the disclosure further disclose methods, and apparatus comprising means for performing as disclosed above and throughout the disclosure. Aspects of the disclosure, further disclose a non-transitory computer-readable storage medium, wherein the non-transitory computer-readable storage medium may include instructions executable by a dedicated computer vision (CV) microprocessor for performing aspects of the disclosure discussed above and throughout the specification.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

A sensor may include a sensor element array of a plurality of sensor elements. The sensor element array may be a 2-dimensional array that includes sensor elements arranged in two dimensions, such as columns and rows, of the sensor element array. Each of the sensor elements may be capable of generating a sensor reading based on environmental conditions. In certain implementations, the sensor may be a vision sensor and may generate sensor readings based on light incident upon the sensor elements. FIG. 1 illustrates an example sensor 100 comprising a plurality of sensor elements arranged in a 2-dimensional array. In FIG. 1, the illustration of the sensor 100 represents 64 (8×8) sensor elements in the sensor element array. In various implementations, the shape of the sensor elements, the number of sensor elements and the spacing between the sensor elements may vastly vary, without departing from the scope of the invention. Sensor elements 102 represent example sensor elements from a grid of 64 sensor elements. Each of the plurality of sensor elements 102 is capable of generating a signal based on light incident upon the sensor 100, the signals corresponding to the plurality of sensor elements representing an image.

Figure 2:
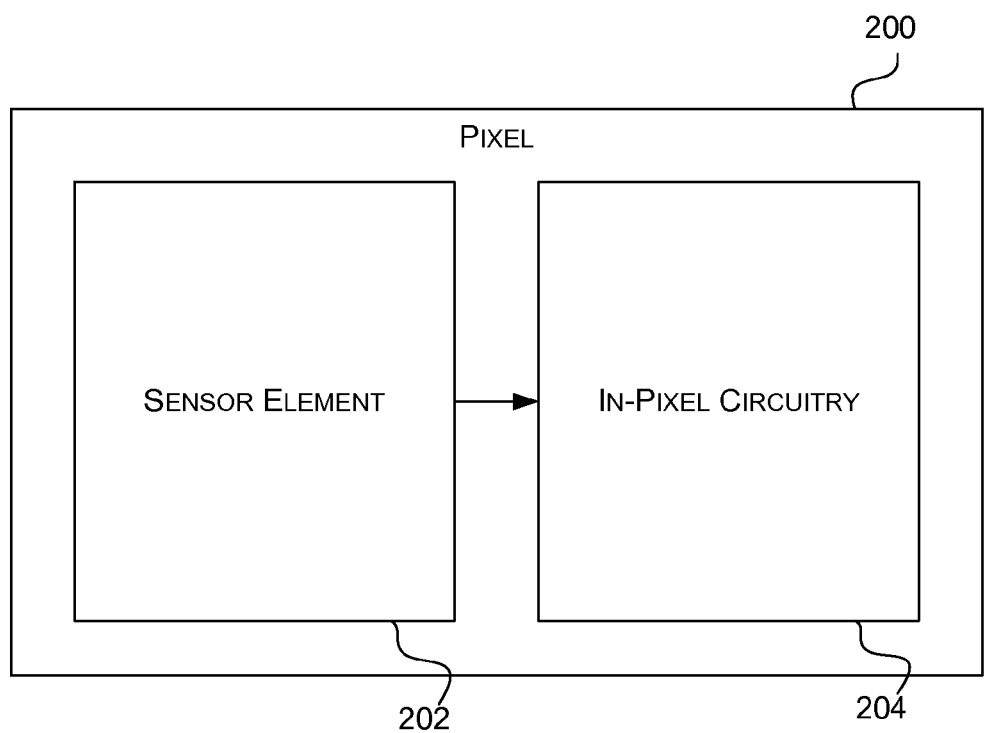
FIG. 2 illustrates an example pixel comprising a sensor element and in-pixel circuitry.

In certain implementations, the sensor elements may have dedicated CV computation hardware implemented as in-pixel circuitry (computation structure) coupled to the sensor element. In some implementations, the sensor element and the in-pixel circuitry together may be referred to as a pixel. The processing performed by the in-pixel circuitry coupled to the sensor element may be referred to as in-pixel processing. In some instances, the sensor element array may be referred to as the pixel array, the difference being that the pixel array includes both the sensor elements and the in-pixel circuitry associated with each sensor element. FIG. 2 illustrates an example pixel 200 with a sensor element 202 and in-pixel circuitry 204. In certain implementations, the in-pixel circuitry 204 may be analog circuitry, digital circuitry or any combination thereof.

In certain implementations, the sensor element array may have dedicated CV computation hardware implemented as peripheral circuitry (computation structure) coupled to a group of sensor elements. Such peripheral circuitry may be referred to as on-chip sensor circuitry. However, in some implementations, such peripheral circuitry may also be implemented off-chip whereby the sensor and the peripheral circuitry are not fabricated on a single substrate. FIG. 3 illustrates an example peripheral circuitry (304 and 306) coupled to the sensor element array 302.

As described herein, the dedicated CV computation hardware computes CV features or localized CV features for a subject sensor element based on, at least in part, signals associated with a plurality of neighboring sensor elements in proximity to the subject sensor element. In some implementations, dedicated CV computation hardware computing CV or localized CV features (for example, hardware-based CV computation) differs from conventional software computing techniques in that software computing techniques run software-based CV computation algorithms on general purpose processors. Such CV features may then be computed for each of the plurality of sensor elements, taking each of the plurality of sensor elements as the subject sensor element. It is understood that, in some implementations, localized CV features can be computed for a block of one or more subject sensor elements rather than for a single subject sensor element. In other words, CV feature computations can be performed on summed or averaged signals corresponding not to a single sensor element but rather to blocks of sensor elements or pixels. In such implementations, discussions referencing a subject sensor element (or signals associated with a subject sensor element) and/or neighboring sensor elements (or signals associated with a plurality of neighboring sensor elements) can be understood to refer to a combined, summed, or averaged value associated with a block of subject sensor elements standing in for the subject sensor element or neighboring sensor elements. For example, a CV feature may be computed for sensor element block 103 based on, at least in part, signals (for example combined, summed, and/or averaged signals) associated with a plurality of neighboring sensor elements in proximity sensor element block 103, for example the plurality of neighboring sensor elements associated with sensor element blocks 104a, 104b, 104c, 104d, 104e, 104f, 104g, and/or 104h. It is understood that sensor element blocks 103, 104a, 104b, 104c, 104d, 104e, 104f, 104g, and/or 104h can include blocks of one by one sensor elements (one total sensor element), one by two sensor elements (two total sensor elements), two by two sensor elements (four total sensor elements), two by three sensor elements (six total sensor elements), three by three sensor elements (nine total sensor elements), etc. In general, sensor elements blocks can include any n by m block, where n and m can each independently be any number greater than one, but less that the number of sensor elements along one or another of the two dimensions of the sensor array.

As described herein, CV features or localized CV features may refer to detecting low level computer vision markers or indicators, such as labels associated with each sensor element or pixel of the sensor. For example, a label may include a local binary pattern (LBP) label for a sensor element. An LBP label for a sensor element may be generated by comparing the sensor readings of the sensor element and some of its neighboring sensor elements. In general, CV features, labels, or feature descriptors computed with reference to a given sensor element may be associated with (1) edges, (2) labels like LBP or local ternary patterns (LTP), (3) gradients or their signs, for example histogram of signed gradients (HSG) or histogram of oriented gradients (HOG) (4) 1D, 2D or 3D convolutions, (5) corners like Harris or FAST, (6) degrees of curvature, (7) maximum or minimum values, (8) continuities and/or discontinuities, (9) contrast, (10) normalized pixel differences (NPD), (11) template-matching, etc.

As described herein, the sensor elements relatively close to the subject sensor element may be referred to as neighboring sensor elements. In certain aspects of the disclosure, the neighboring sensor elements may include sensor elements immediately adjacent to the subject sensor element. In certain other aspects of the disclosure, neighboring sensor elements may also include sensor elements that are relatively close to the subject sensor element and not immediately adjacent. For example, in certain instances, sensor elements within three sensor elements from the subject sensor element may still be considered neighboring sensor elements when the width or height of the number of sensors is sixty-four sensor elements.

Figure 3A:
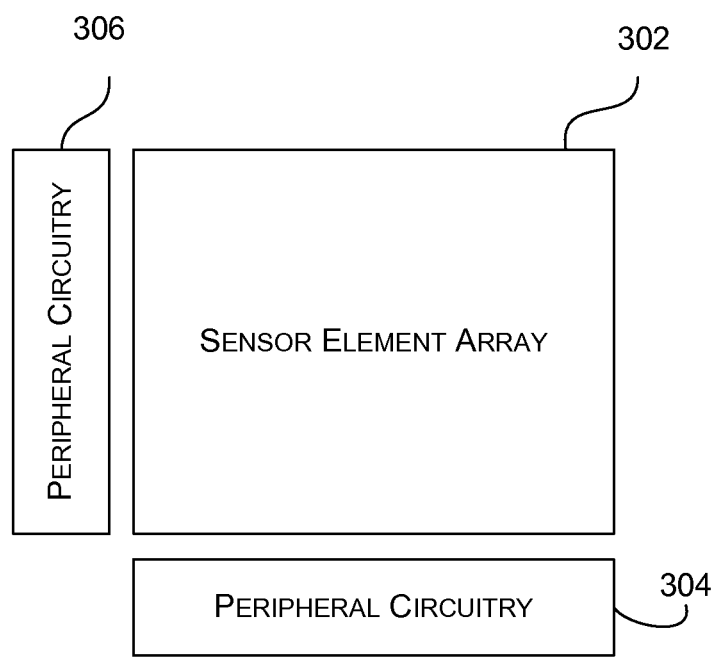
FIG. 3A illustrates an example sensor element array coupled to peripheral circuitry.
Figure 3B:
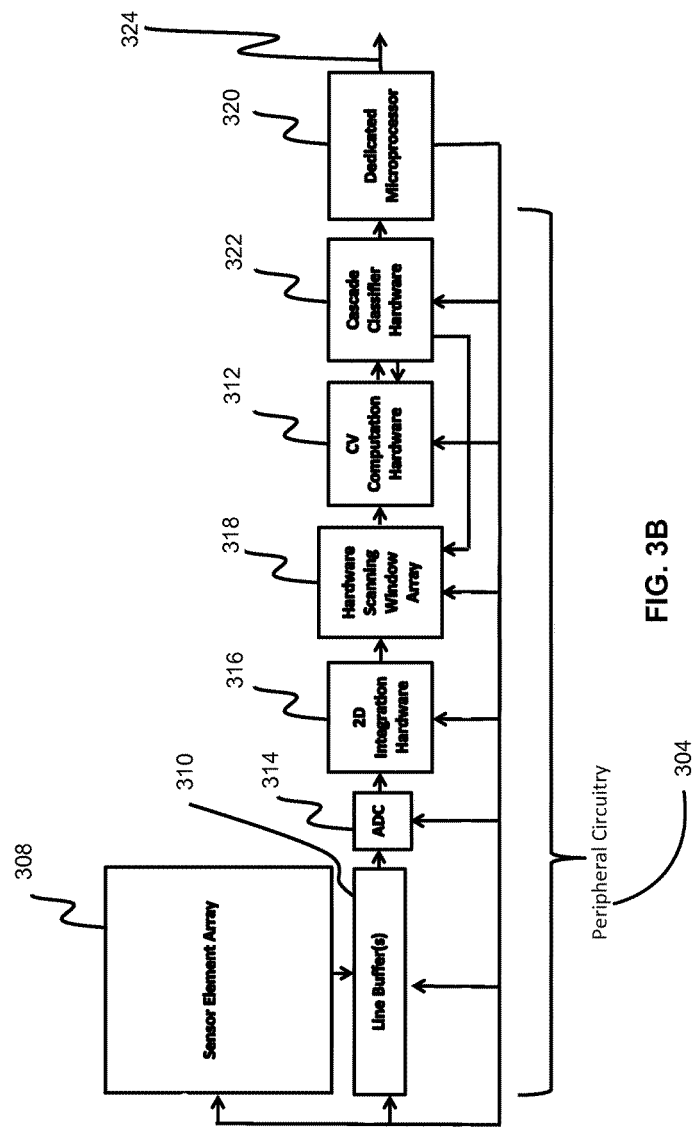
FIG. 3B illustrates an example implementation smart vision sensor.

FIG. 3B illustrates an example implementation smart vision sensor including a sensor element array, CV computation hardware, and dedicated microprocessor that includes an interface for communication with a second microprocessor. The sensor element array 308 may be similar to sensor 100 illustrated in FIG. 1. The sensor element array 308 may include a correlated double sampling circuit. The sensor element array 308 may also include circuitry to combine, sum or average sensor element or pixel signals or values before outputting the signals to line buffer(s) 310, for example in implementations where CV computation is improved using combined values or a lower resolution. Line buffer(s) 310 may include one or more line buffers to transfer signals representing the image or portions of the image out of the sensor element array 308 to other portions of the vision sensor. In some implementations, the sensor element array 308 may not include circuitry for image signal processing (ISP), and hence, FIG. 3B illustrates an implementation where the sensor element array 308 and CV computation hardware 312 are connected without intervening ISP circuitry. For example, in some implementations, the signals received by the CV computation hardware 312 from the sensor element array 308 have not undergone one or more of defect correction, white balancing, color balancing, auto focus, lens roll off, demosaicing, debayering, and/or image sharpening. However, in some such no-ISP implementations, some processing may occur, such as focusing or auto-exposure correction. Such signals that have not undergone ISP may be referred to as raw signals. In one implementation, the sensory element array 308 is a Quarter Video Graphics Array (QVGA) camera sensor without ISP with the array comprising 320 by 240 sensor elements.

In various implementations, the CV computation hardware 312 can perform CV computations in either the digital or analog domain. Some examples of CV computation circuits capable of performing CV computations in the analog domain are disclosed herein with reference to FIGS. 9 and 10. Digital versions of those and similar circuits are also possible. Therefore, optionally, in digital implementations, an analog-to-digital converter (ADC) 314 may be disposed between the line buffer(s) 310 and the CV computation hardware 312. In some implementations, the CV computation hardware 312 is dedicated CV computation hardware in the sense that it is hardware designed to have little or no functionality other than to compute CV features.

In some implementations, the CV computation hardware 312 may use combinations, sums, or averages of signals associated with blocks of sensor elements or pixels as discussed with reference to FIG. 1. In such implementations, an integral image, as described with reference to FIGS. 16A-16B, 17A-17D, 18A-18B, 19, and 20, can be useful in computing such combinations, sums, or averages prior to input into the CV computation hardware 312. Therefore, optionally, the vision sensor may also include two dimensional integration hardware 316 for computing an integral image of at least a part of the image based on at least a subset of the signals representative of the image sampled by at least a subset of sensor elements in the sensor element array. As illustrated, the two dimensional integration hardware 316 can be in communication with the dedicated CV computation hardware. The integral image representative of the image sampled by the sensor element array and/or the integral image of a portion of the image sampled by the sensor element array can be used to more quickly combine, sum, or average signal values for blocks of sensor elements compared to adding the signal values directly, as explained elsewhere herein. Two dimensional integration hardware 316 can include circuitry capable of generating signals representative of the integral image of all or a portion of the image sampled by sensor element array in either the digital or analog domains based on raw signals from the sensor element array. In some implementations, the integral image (which may be an integral image of only a portion or sample window of the image sampled by the sensor element array) generated by the two dimensional integration hardware 316 can be stored in a hardware scanning window array 318, as illustrated in FIG. 3B. For example, the hardware scanning window array may include a random-access memory (RAM) array or other form of analog or digital memory for storing the integral image. In implementations where computing combinations, sums, or averages of signals corresponding to blocks of sensor elements is not useful, such as pixel-level LBP, it is understood that the two dimensional integration hardware 316 may not be included, and hence a sample window including analog raw signals from the sensor element array 310 or converted-to-digital raw signals from the ADC 314 may be stored directly in the hardware scanning window array 318. Furthermore, it is understood that in some implementations, two dimensional integration hardware 316 may also or instead perform one dimensional integration, as discussed with reference to FIGS. 17A-17D, 18A-18B, 19, and 20. Similarly, the hardware scanning window array 318 may store a one dimensional integral image corresponding to a sample window of the image captured by the sensor array 308. Use of one dimensional integral images can allow for the computation of multi-block LBP, for example, using rotated blocks in order to detect rotated reference objects, for example, faces.

The vision sensor may also include CV computation hardware 312. In some implementations, the CV computation hardware can compute a localized CV feature for a block of one or more subject sensor elements based on, at least in part, signals associated with a plurality of neighboring sensor elements in proximity to the block of sensor elements. For example, in a local binary pattern (LBP) implementation of CV computation hardware, CV computation hardware can include hardware that receives signal values corresponding to raw image signals—or combinations, sums, or averages of raw image signals (generated, for example, using an integral image)—and generates a digital LBP label based on the raw image signals. In implementations where multi-block LBP is computed, the block of one or more subject sensor elements can include, as one example, a block of 11 by 11 sensor elements. It is also understood that a pixel-level LBP computation may also be made where the block of one or more subject sensor elements for which the localized CV feature is computed is a single subject sensor element. Although the description above referenced CV computation hardware 312 as separate from the dedicated microprocessor 320, it is understood that in some implementations, dedicated CV computation hardware 312 may be implemented in hardware within the dedicated microprocessor 320.

Generating the CV features, such as the LBP labels discussed above, in dedicated hardware can reduce the power of the vision sensor compared to computing the CV features in a processor, for example a general purpose processor such as an application processor or even a dedicated microprocessor. However, the vision sensor may still include a dedicated microprocessor 320 coupled to the CV computation hardware 312. The dedicated microprocessor 320 receives the hardware-computed CV features from the CV computation hardware 312 and can perform higher-level computer vision operations such as object-class detection (of which face detection can be regarded as a specific case), in which the task is to find the locations and sizes of all objects in an image that belong to a given class, as well as other computer vision operations. Furthermore, the dedicated microprocessor 320 can provide control signals to the line buffer(s) 310, ADC 314, two dimensional integration hardware 316, hardware scanning window array 318, and CV computation hardware 312. In some implementations, to perform the object-class detection or other computer vision operations, the dedicated microprocessor 320 may use a cascade classifier algorithm to perform object-class detection, for example face detection. In an optional implementation, further power savings are possible by implementing the cascade classifier in hardware, to further reduce the computational burden on the microprocessor The optional cascade classifier hardware 322 includes a hardware implementation of a cascade classifier. In some implementations, the cascade classifier is trained using machine learning techniques on a data set of images including examples of the object the cascade classifier will be trained for and examples of non-objects, for example images of faces and non-faces. For example, in a first stage, the cascade classifier hardware may request from the CV computation hardware 312 that LBP features be computed for a certain number, l, of subject sensor elements stored in, for example, the hardware scanning window array 318. In addition, the location of the subject sensor elements, $\{(x_{11}, y_{11}), \ldots (x_{1l}, y_{1l})\}$, will also be provided by the cascade classifier hardware 322. Once the CV computation hardware 312 provides the requested LBP features, which can be treated as vector values, the cascade classifier hardware performs a summation of a dot product of each of the LBP features with one or more weights to generate a first weighted scalar sum value. In general, each LBP feature, $(LBP_{11}, \ldots, LBP_{1l})$ will be multiplied by a given weight, $(w_{11}, \ldots, w_{1l})$, each of which can be different. The first weighted scalar sum value is then compared to a first threshold. If the scalar sum is less than the threshold, then to a given probability, there is no face in the portion of the image represented by the signals stored in the hardware scanning window array 318, and hence the cascade classifier hardware 322 sends a signal to the hardware scanning window array 318, and optionally to other components of the vision sensor, such as the line buffer(s) 310 and the sensor element array 308, to indicate that the hardware scanning window array 318 should continue scanning and add one or more new columns or rows and remove one or more old columns or rows. With a subsequent window of the image, or a subsequent plurality of signals corresponding to a subsequent subset of sensor elements of the sensor element array, stored in the hardware scanning window array 318, the process can begin anew. It is understood that the subsequent window of the image may overlap in large part with the previous window of the image. In some implementations, the image is scanned from left to right, and once the end of the sensor element array 308 is reached, the image may be scanned again from left to right after moving down one or more rows. In another implementation, the image may be scanned from right to left after shifting down by one or more rows, which may allow for an increased overlap with the prior image.

If the scalar sum is greater than the first threshold, then the cascade classifier hardware 322 moves to the next stage. In the next (in this example, second) stage, the cascade classifier hardware again requests the CV computation hardware 312 to provide LBP features for m subject sensor elements at locations $\{(x_{21}, y_{21}), \ldots (x_{2m}, y_{2m})\}$ stored in the hardware scanning window array 318. Once the CV computation hardware 312 computes and provides the requested LBP features, $(LBP_{21}, \ldots, LBP_{2m})$, the cascade classifier hardware 322 performs another summation of a dot product of each of the LBP features with one or more weights, $(w_{21}, \ldots, w_{2m})$, to generate a second weighted scalar sum value. The second weighted scalar sum value is then compared to a second threshold. If the scalar sum is less than the second threshold, there is a low likelihood of a face being present in the portion of the image represented by the signals stored in the hardware scanning window array 318, and the cascade classifier sends a signal to the other components in the vision sensor array to continue scanning and move to a next portion of the image. If the second weighted scalar sum value is greater than the second threshold, the process continues to a third stage as described above. At the end of a final stage, for example an Nth stage in a N-stage cascade classifier, if the Nth weighted scalar sum value is greater than the Nth threshold, then a face is detected in the portion of the image stored in the hardware scanning window array 318. The cascade classifier hardware 322 can then indicate to the dedicated microprocessor 320 that a face has been detected, and may further optionally indicate the location of the portion of the image in which the face or portion of a face was detected.

The numbers and locations of subject sensor elements within the hardware scanning window array 318 for which LBP is to be computed at each stage is generally programmed into the cascade classifier hardware 322 and result from the machine learning training discussed above. Similarly, the weights to multiply to each of the LBP features are also generally determined during machine learning training and then programmed into the cascade classifier hardware 322. The number of stages also results from the training, and is programmed into the cascade classifier hardware 322. In some implementations, a cascade classifier can include between 1 and 31 stages, for example, 15 stages. Cascade classifier hardware 322 can, in some implementations, be considered dedicated cascade classifier hardware in the sense that it is hardware designed to perform the cascade classifier function and little to no other significant functions. While the implementation described above relates to a cascade classifier based on programmed weights and thresholds based on previous, in the laboratory, training and machine learning to generate a model, it is understood that cascade classifier hardware 322, or other hardware in peripheral circuitry designed to perform CV operations based on hardware-computed CV features received from CV computation hardware 312, can be designed to perform machine learning in the field.

In the implementation just described, the dedicated microprocessor 320 can then determine what to do with the, for example, face detected event. For example, it may send an event to a second microprocessor. In some implementations, the dedicated microprocessor 320 and the second microprocessor may correspond to dedicated microprocessor 406 and the application processor 408 of FIGS. 4A and 4B, respectively. As illustrated in FIG. 3B, the dedicated microprocessor 320 includes an interface 324 for communications with the second microprocessor.

Although the description above referenced cascade classifier hardware 322 as separate from the dedicated microprocessor 320, it is understood that in some implementations, the dedicated cascade classifier hardware 322 may be implemented in hardware within the dedicated microprocessor 320. Alternatively, a cascade classifier may be run as a software algorithm on the dedicated microprocessor 320. Furthermore, other software algorithms may be run on the dedicated microprocessor in the place of, or in addition to, the cascade classifier. For example, face detection may be performed using histograms, as described in FIG. 14C. In some such implementations, a histogram of all LBP labels computed for a sample window of the image stored in the scanning window array 318 can be compared to a reference histogram to detect the presence of a face in the sample window stored in the scanning window array 318. In some implementations, dedicated hardware may be implemented to detect, for example, a face using histograms. Such an implementation may include such dedicated hardware in the place of, or in addition to, cascade classifier hardware 322.

In the implementation illustrated in FIG. 3B, one or more of the line buffer(s) 310, the ADC 314, the two dimensional integration hardware 316, the hardware scanning window array 318, the CV computation hardware 312, the cascade classifier hardware 322, or any combination thereof, may be considered peripheral circuitry 304, that is circuitry that is peripheral to the sensor element array 308. It is also understood that the various components just listed, or any combination thereof, may be implemented instead as in-pixel circuitry within the sensor element array 308.

In various implementations illustrated in FIGS. 2, 3A and 3B the dedicated CV computation hardware may be implemented as digital logic coupled to the sensor element array using an Application Specific Integrated Circuit (ASIC), Field Programmable Gate Array (FPGA), or any similar analog or digital computing logic for performing aspects of the disclosure.

In certain implementations, the dedicated CV computation hardware implemented as dedicated CV processing module may be configured to execute instructions stored on a non-transient computer-readable medium for calculating CV features. For example, in contrast to a general purpose processor that may execute an operating system with several different functions and applications for servicing interrupts from user interfaces, interacting with I/O, etc., a dedicated CV computation hardware implemented as a dedicated CV processing module may be configured primarily to execute instructions for computing the CV features.

Figure 4A:
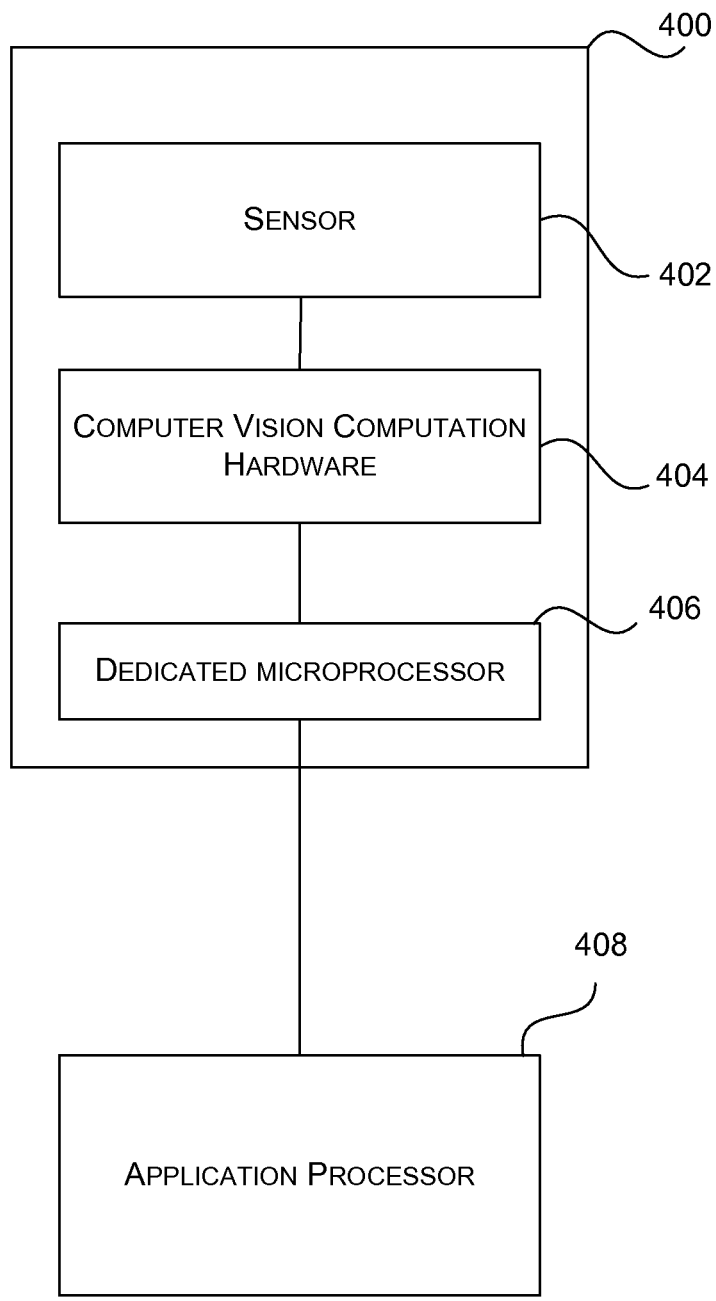
FIG. 4A illustrates an example sensor apparatus according to certain aspects of the disclosure.

Furthermore, as shown in FIG. 4A, in certain implementations, the sensor apparatus 400 may have a sensor 402, computer vision computation hardware 404 and a dedicated microprocessor 406. The computer vision computation hardware 404 may be in-pixel or peripheral circuitry, as described in FIGS. 2, 3A and 3B for performing initial processing on the sensed information. The dedicated microprocessor 406 may be implemented using an ASIC, FPGA, embedded microprocessor, or any similar analog or digital computing logic for performing aspects of the disclosure.

It should be noted, that at least in certain implementations, the dedicated microprocessor 406 is in addition to an application processor 408 and not instead of the application processor 408. For example, the dedicated microprocessor 406 may receive indications of detected computer vision features, object-class detections, and/or pattern matches against previously stored images or reference indicators to determine macro-features or detect the presence or absence in an image of reference objects, such as smiles, faces, objects, etc. As used herein, macro-features can refer to an object (such as a face), or part or aspect of an object (skin texture, a smile, an expression on a face), that is detected using CV computations or operations that are based on computed, for example hardware-computed, CV features. The dedicated microprocessor 406 may send an indication of a macro-feature detection to the application processor 408. The application processor 408 may take that information and perform actions based on that input. For example, for a mobile device, the application processor 408 may unlock the mobile device screen after detecting the user's face. Similarly, for a puppy toy, the application processor 408 may generate a friendly audio bark when a smile is detected. In any case, higher level computer vision features can be computed by a low power system including the dedicated microprocessor 406, such as sensor apparatus 400, with power savings relative to computer vision feature computation directly by the application processor 408. This is especially the case in implementations where the applications processor is a higher power processor than the dedicated microprocessor 406.

Generally, such as in a mobile device context, the application processor 408 may be relatively more complex, compute-intensive, power-intensive and responsible for executing system level operations, such as operating system operations, and may implement the user interface for interacting with the user, perform power management for the device, manage memory and other resources, etc., while the dedicated microprocessor may be relatively less so. The application processor 408 may be similar to processor(s) 2110 of FIG. 21.

However, in certain implementations, the application processor 408 is less complex and low powered. For example, a toy that has camera and video capabilities may detect that the child is smiling within the sensor apparatus 400 itself and then perform the action of barking using logic from the application processor 408.

FIG. 4A discloses the dedicated microprocessor 406 coupled to the application processor 408 using a wired interface. Examples of a wired interface between the dedicated microprocessor 406 and the application processor 408 may include one or more of serial peripheral interface (SPI), Inter-Integrated Circuit (I2C), low voltage differential signaling (LVDS) or any other suitable wired protocol for that matter.

Figure 4B:
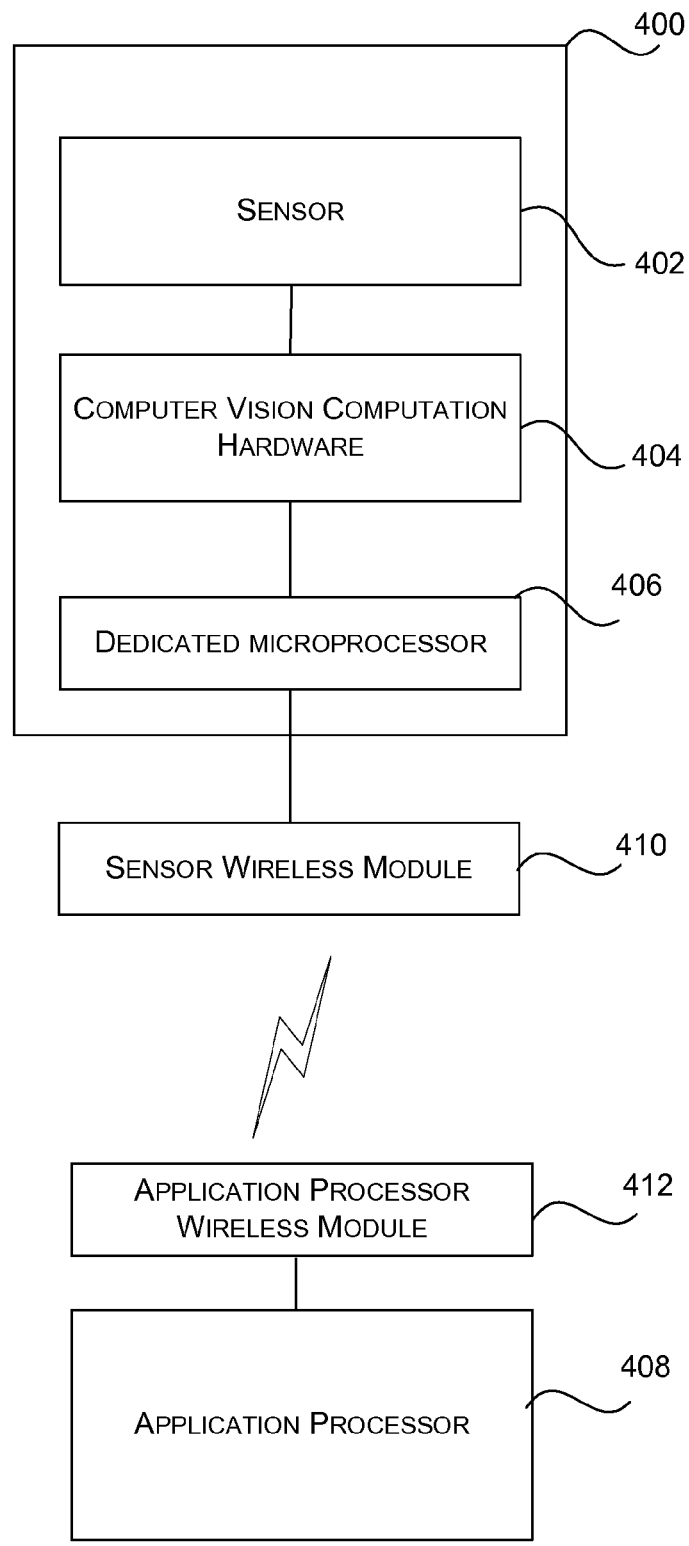
FIG. 4B illustrates an example sensor apparatus wirelessly coupled to an application processor, according to certain aspects of the disclosure.

However, as shown in FIG. 4B, in certain implementations, the dedicated microprocessor 406 may be coupled to the application processor 408 using a wireless interface. For connecting to application processor 408 wirelessly, the dedicated microprocessor 406 may be connected to an intermediate wireless module 410 coupled to the sensor apparatus 400, referred to as sensor wireless module 410 in FIG. 4B. In some implementations, the sensor wireless module 410 can be connected to the dedicated microprocessor 406 using the wired interface discussed above. In turn, the sensor wireless module 410 may wirelessly communicate with the application processor wireless module 412 that may be coupled to the application processor 408. The wireless modules may be configured to use one or more suitable wireless protocols to communicate with the application processor 408, such as Zigbee (IEEE 802.15.4 standard), Bluetooth®, body area network (IEEE 802.15.6), wireless USB, Wi-Fi (802.11), Z-wave, or IrDA (Infrared-based communications).

According to aspects of the disclosure, in certain embodiments, a variety of different sensors may be improved according to aspects of the current disclosure. Example sensors may include vision sensors, olfactory sensors and/or chemical sensors. Although vision sensors are discussed throughout the disclosure, similar techniques may be employed in other types of sensors without deviating from the scope of the invention.

Techniques, in one implementation, describe dedicated circuits or systems for the computing of features (e.g. CV features and macro-features) within in-pixel, peripheral circuitry, or dedicated microprocessor before the sensor data is sent to an application processor or any other processing entity external to the sensor apparatus. Such dedicated circuit for computation of a feature leads to power savings as (1) the circuit is optimized for computation of the specific feature, (2) less overheads are involved related to processor instruction decoding, memory transfers, etc.

In addition, macro-features such as face, smiles, etc. may be derived from the CV features and may also be generated using the computer vision computation hardware 404 and/or dedicated microprocessor 406.

Figure 5:
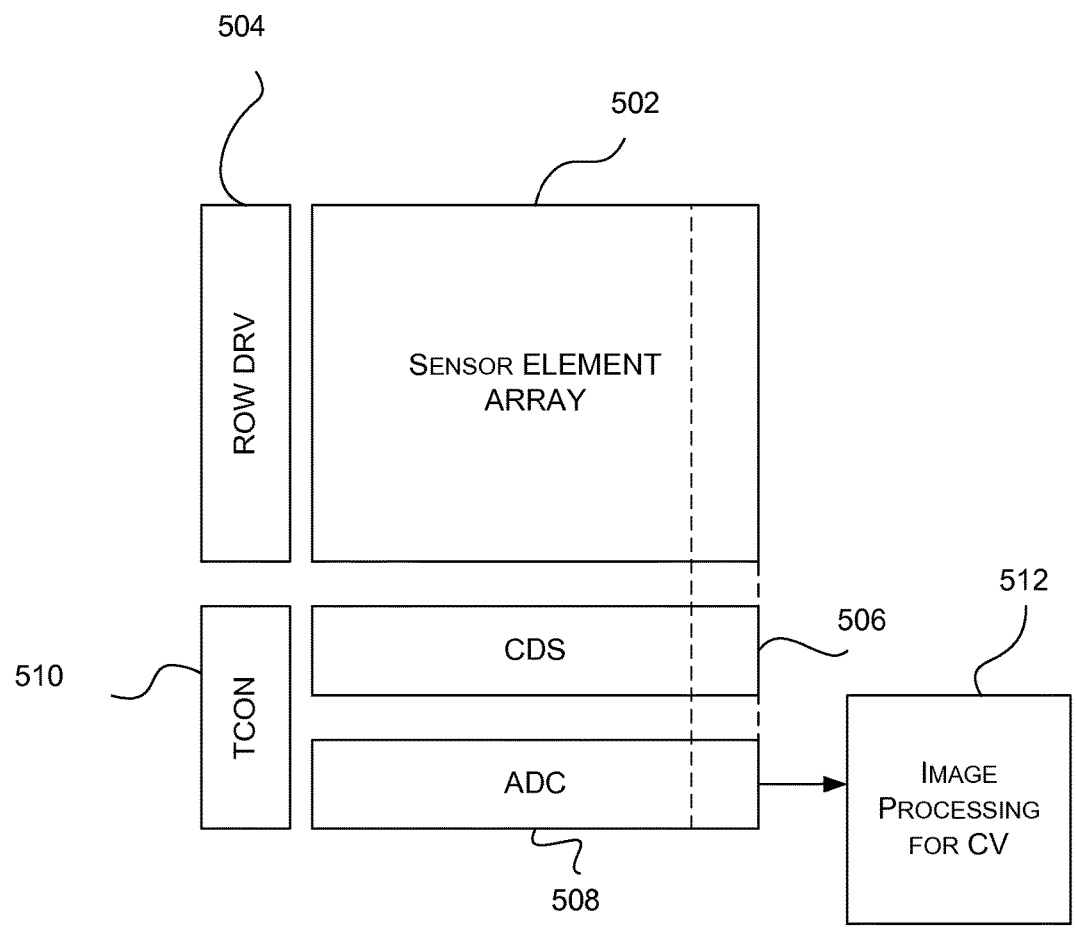
FIG. 5 illustrates an example implementation of a vision sensor using a frame-based camera.
Figure 6:
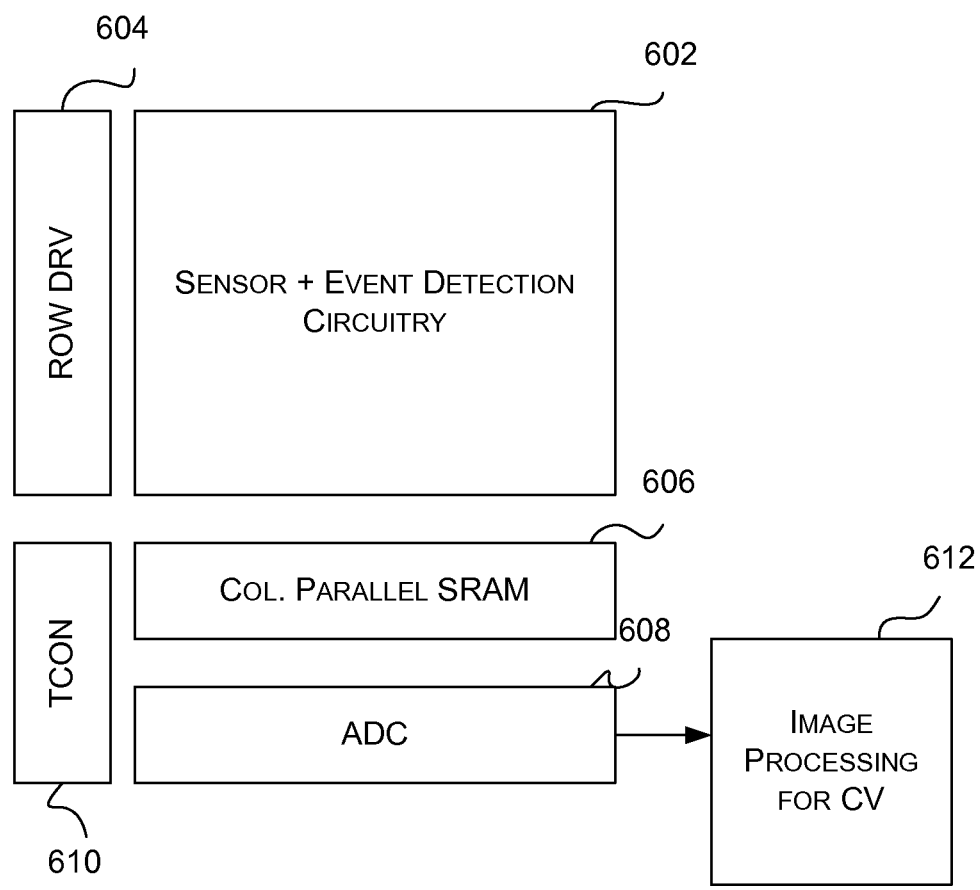
FIG. 6 illustrates an example implementation of a vision sensor using an event-based camera.

FIG. 5 and FIG. 6 illustrate example implementations for sensing apparatus comprising vision sensors. Several techniques may be employed for acquiring an image or a sequence of images, such as a video, using one or more cameras coupled to a computing device.

FIG. 5 illustrates an example implementation of a vision sensor. A vision sensor, such as an advanced photo sensor (APS), may be used in an image or video camera for acquiring image data. In a frame-based implementation, the image data acquisition may be synchronized to a clock and data for the entire image frame may be acquired at a pre-determined frequency synchronous to an acquisition clock. In one implementation, the camera may comprise a sensor element array 502, comprising a plurality of sensor elements. Each sensor element may be coupled to in-pixel circuitry and together may be referred to as a pixel. Each pixel may be configured to acquire image data synchronous with the acquisition clock.

As shown in FIG. 5, the row driver 504 (ROW DRV) triggers reading of data row by row for the entire frame, and sends the data to an image processing block executing on a processor for CV operations. The timing controller 510 (TCON) triggers correlated double sampling at the correlated double sampling block 506 (CDS). Correlated double sampling may be employed for calibrating the detection voltage for each sensor. For example, in one implementation, the voltage may be detected when the sensor is exposed to light to appropriately calibrate the detection voltage for the sensor element. The information is transferred within the analog domain between the sensor and the CDS. The CDS processes the data and sends the data to the analog to digital converter 508 (ADC) inside the analog domain. The ADC converts the analog data to digital data and transmits the data to a processor for image processing using CV operations using a processor 512. As discussed in more detail below, performing CV calculations in frame-based cameras leads to high power-consumption.

FIG. 6 illustrates example implementations for a sensing apparatus comprising a vision sensor. Several techniques may be employed for acquiring an image or a sequence of images, such as a video, using one or more cameras coupled to a computing device.

FIG. 6 illustrates an example implementation of a vision sensor using an event-based camera. A vision sensor may be used in an image or video camera for acquiring image data. Event-based camera sensors may be configured to acquire image information based on an event. In one implementation, the event-based camera may comprise a plurality of pixels, as shown in FIG. 1. Each pixel may comprise a sensor element and in-pixel circuitry. Each pixel may be configured to acquire image data based on an event detected at the pixel. For example, in one implementation, a change in the environmental conditions (e.g., change in light reflecting off an object) perceived at any given pixel may result in a voltage change beyond a threshold and may result in an event at the pixel. In response to the event, the logic associated with the pixel may send the sensor element reading to the processor for further processing.

Figure 7:
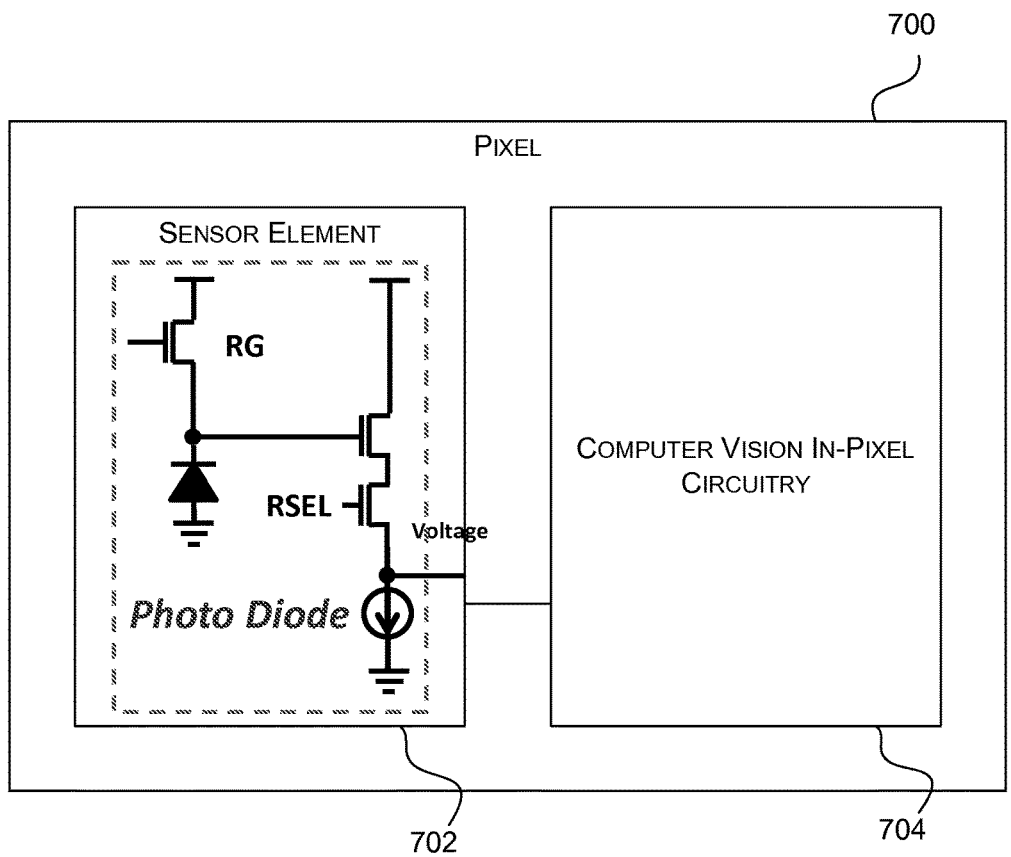
FIG. 7 illustrates an example pixel for a vision sensor, according to certain aspects of the disclosure.

Referring to FIG. 7, each pixel 700 may include a photo diode 702 and dynamic vision sensors (DVS) 704 circuitry, as shown in FIG. 7. The DVS module may also be referred to as event detection circuitry. The event detection module detects a change in the value at a pixel and generates an event indicator. If an event is detected, sensor reading is sent out to a processor when the intensity of the pixel changes beyond a threshold. In some instances, the location of the sensor element at which the event was detected along with a payload is sent to a computer system for further processing. In one implementation, the payload may be the intensity voltage, the change in the intensity voltage or the polarity (sign) of the change in the intensity voltage. In some instances, event-based cameras may result in a substantially lower amount of data being transferred to a processor for further processing, as compared to traditional frame-based cameras, resulting in power savings.

In FIG. 6, block 602 collectively represents the sensor and the event detection circuitry. Block 602 represents a sensor with a plurality of pixels, each pixel comprising a sensor element and circuitry for event detection. Each pixel generates a sensor reading using the sensor element. The sensor readings are later digitized i.e., converted from analog to digital data using an ADC converter 608. The row driver 604 (ROW DRV) triggers reading of data row by row for the entire frame. The timing controller 610 (TCON) triggers the sampling of the sensor readings. In one embodiment, the result of a previous sensor read may be stored in the Column parallel SRAM 606 for each pixel. The results stored in the column parallel SRAM 606 may be used by the comparator to compare and trigger an event, based on a comparison between the current sensor reading and a previous sensor reading. The analog information acquired at the pixel is converted to the digital domain using an analog to digital (ADC) converter 608. The digitized sensor reading may be sent to the processor 612 for further image processing using computer vision operations.

The processor 612 may perform certain CV operations on the information received from the individual pixels for detecting features and consequently objects associated with those features. Features may include less complex features such as edges, corners, etc. The CV operations may use information from multiple pixels from the sensor element array for detecting features by performing a multi-pixel computation. For example, for performing CV operations for a subject sensor element or pixel, the CV operations may use sensor readings generated by neighboring sensor elements or pixels in proximity to the subject sensor element or pixel.

As described herein, the sensor elements relatively close to the subject sensor element may be referred to as neighboring sensor elements. In certain aspects of the disclosure, the neighboring sensor elements may include sensor elements immediately adjacent to the subject sensor element. In certain other aspects of the disclosure, neighboring sensor elements may also include sensor elements that are relatively close to the subject sensor element and not immediately adjacent. For example, in certain instances, sensor elements within three sensor elements from the subject sensor element may still be considered neighboring sensor elements when the width or height of the number of sensors is sixty-four sensor elements.

In certain embodiments, performing CV operations such as LBP and HSG, on an application processor 406, may be power- and processing-intensive when compared to the implementations illustrated in FIGS. 2, 3A, 3B, 4A, 4B. Furthermore, converting the analog pixel value to digital pixel value may consume power and hence, in some implementations, computation of CV features in the analog domain may be useful. Although, as illustrated in some implementations of FIG. 3B, digital implementations may also provide power savings relative to performing the computations performed by CV computation hardware 312 and optionally cascade classifier hardware 322 purely in software in, for example, a microprocessor. Moreover, detecting CV features on the application processor 406 may be power and processing-intensive, since performing CV operations on the application processor 406 in many instances requires storing of information from the sensors in system memory, triggering processing of the sensor information, fetching of instructions from memory for CV computations, and storing the results. In addition, application processor 406 is generally power hungry when executing instructions. A spurious or uninteresting event from the sensor wakes up the application processor 406 that might be operating in a low-power mode due to inactivity and drastically increase the power consumption for the system.

Certain embodiments of the invention describe techniques for performing CV operations, such as LBP and HSG computations using dedicated CV computation hardware, instead of waking up the application processor 406 and computing these low level CV features at the application processor 406.

As described herein, CV features or localized CV features may refer to detecting low level computer vision markers or indicators, such as labels associated with each sensor element or pixel of the sensor. For example, a label may include an LBP label for a sensor element. An LBP label for a sensor element may be generated by comparing the sensor readings of the sensor element and some of its neighboring sensor elements. An LBP label may indicate if the CV feature from the reference of the sensor element represents an edge or line edge, corner or corner of a line edge, curve, spot, etc. Other techniques such as HSG may be used for detecting CV features without deviating from the scope of the disclosure.

As described herein, detecting and/or generating an event based on a change in the CV feature may refer to detecting a change of a feature from the perspective of a sensor element or a small group of sensor elements. For example, an event may be detected and/or generated if the LBP label at a sensor element changes. In other words, if the CV feature detected at the sensor element changes from a spot to an edge, this may trigger generation of an event.

As described in more detail below, the generation of an event with additional information, such as location and CV feature information may be provided to an application processor for further processing. In one aspect of the disclosure, the application processor may use these events and the associated information for detecting macro-features, such as smiles, faces, or any other object for that matter.

Figure 8:
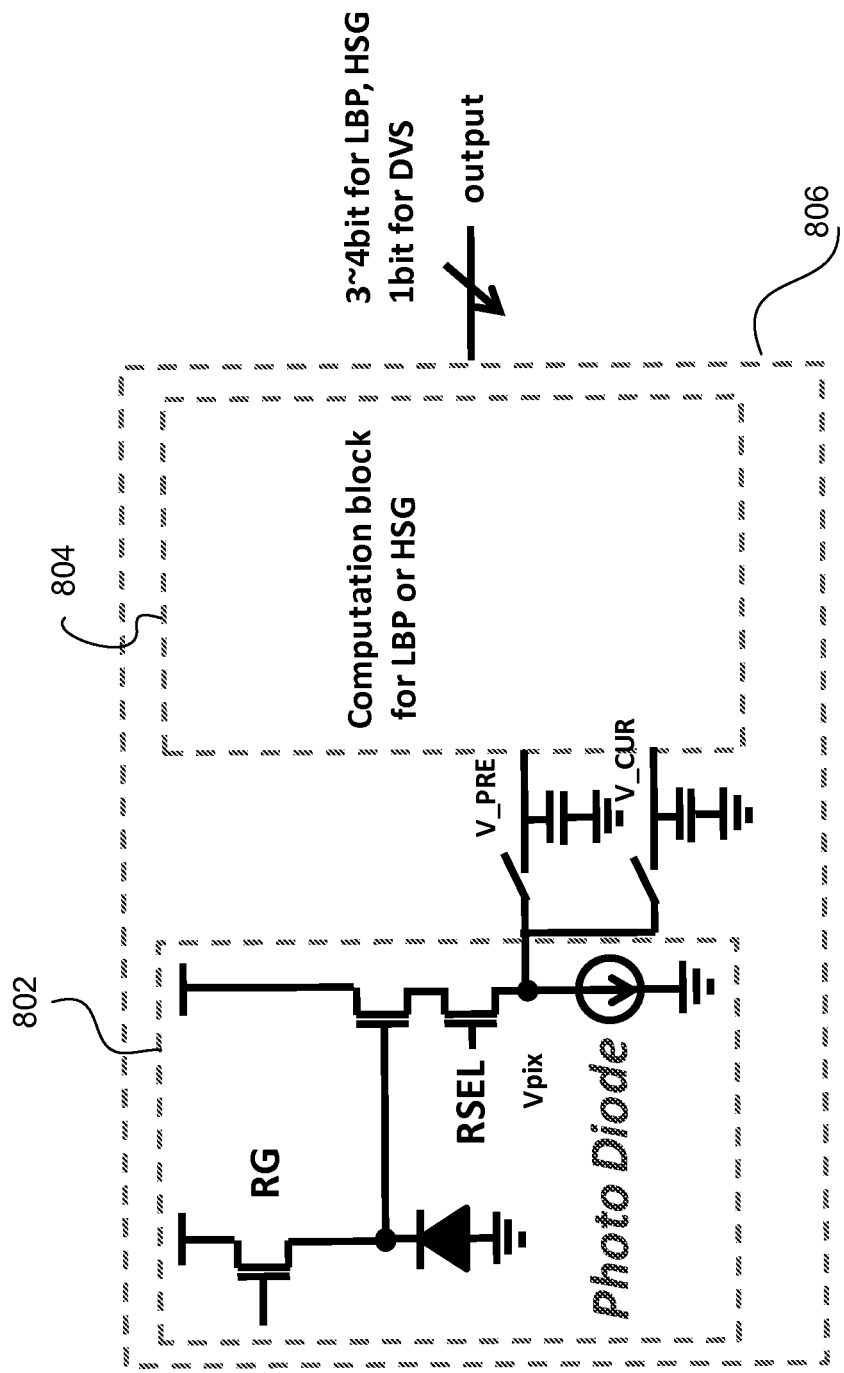
FIG. 8 illustrates an example pixel for performing aspects of the disclosure.
Figure 9:
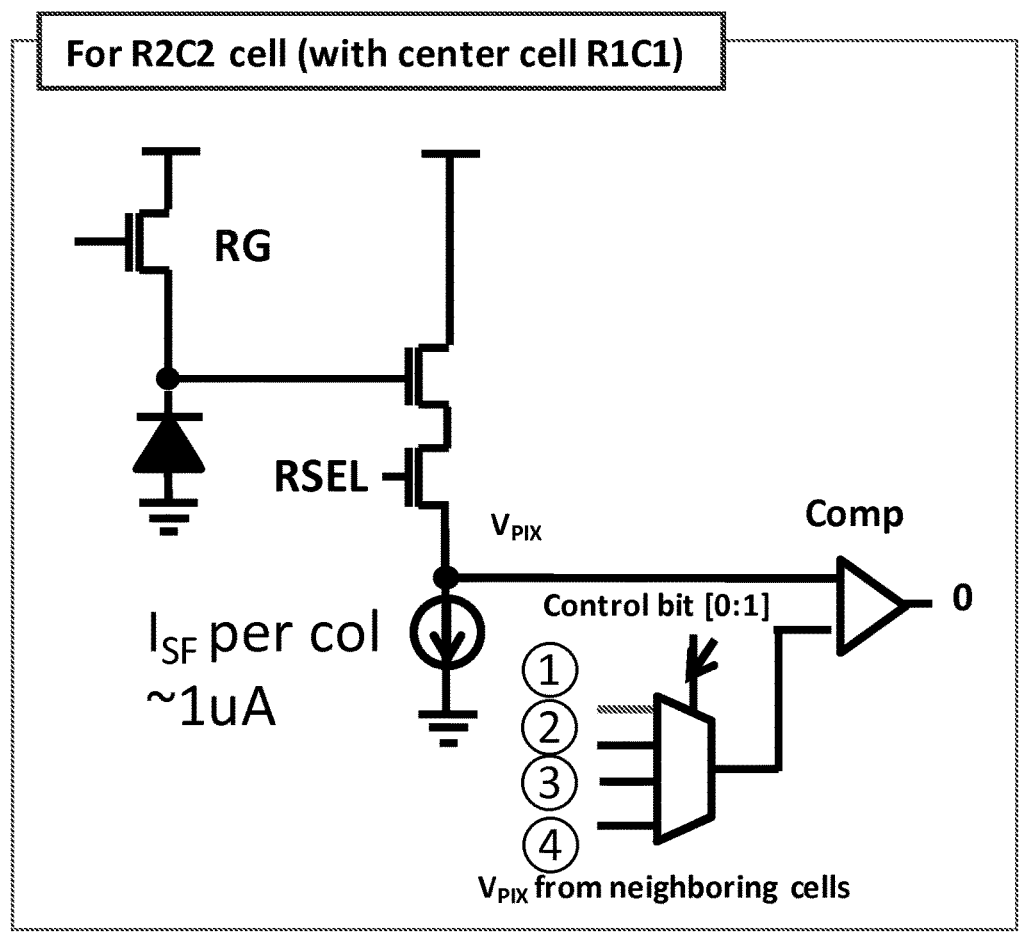
FIG. 9 illustrates example circuitry for a local binary pattern circuitry.
Figure 10:
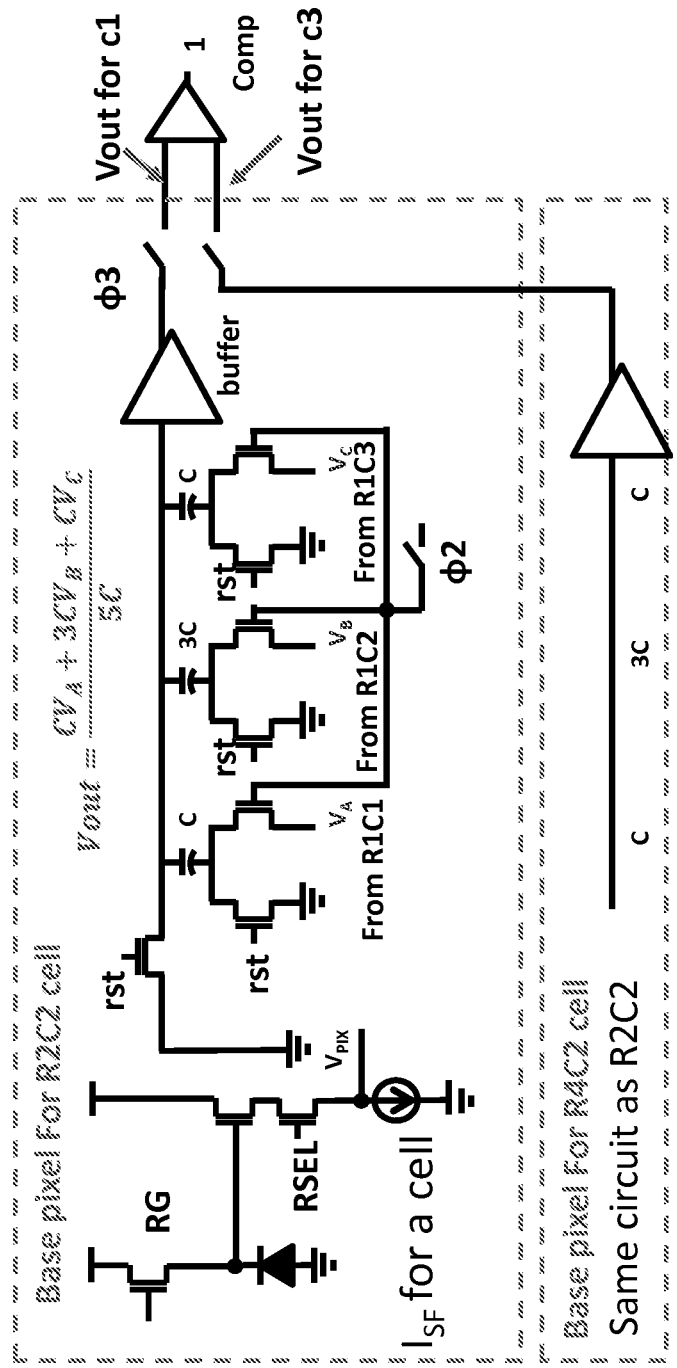
FIG. 10 illustrates example circuitry for a histogram of signed gradients circuitry.

FIG. 8 illustrates an example pixel 806 for performing aspects of the disclosure. The pixel in FIG. 8 comprises a sensory circuitry 802 (for example, at least one photodiode) and CV block 804 for in-pixel analog processing. As shown in FIG. 8, in certain implementations, multiple capacitors may be used for storing previous and current voltages. The CV block 804 may use CV operations such as LBP or HSG for feature detection. The output may include information indicating aspects of the feature detection. FIG. 9 provides example circuitry for calculating LBP labels or features, whereas FIG. 10 provides example circuitry for calculating HSG features. In some instances, capacitors having capacitance values reflect weighting for performing analog weighting and summation as part of the multi-pixel computation, performed based on the sensor readings generated by the neighboring sensor elements. For example for generating an HSG label, applying a voltage to a capacitor with varying capacitance varies the weight associated with that voltage input. When multiple capacitors are chained in parallel, the voltage from multiple pixels applied to the multiple capacitors has the effect of generating a weighted sum based on the capacitance of the respective capacitors.

Although, FIG. 8, FIG. 9 and FIG. 10 illustrate an example implementation of logic and/or circuitry in the in-pixel circuitry (as disclosed in FIG. 2), such logic and/or circuitry may be implemented as peripheral circuitry (as shown in FIGS. 3A and 3B) without deviating from the scope of the disclosure. Furthermore, such logic and/or circuitry may be implemented as analog and/or digital circuitry without deviating from the scope of the disclosure.

Figure 11:
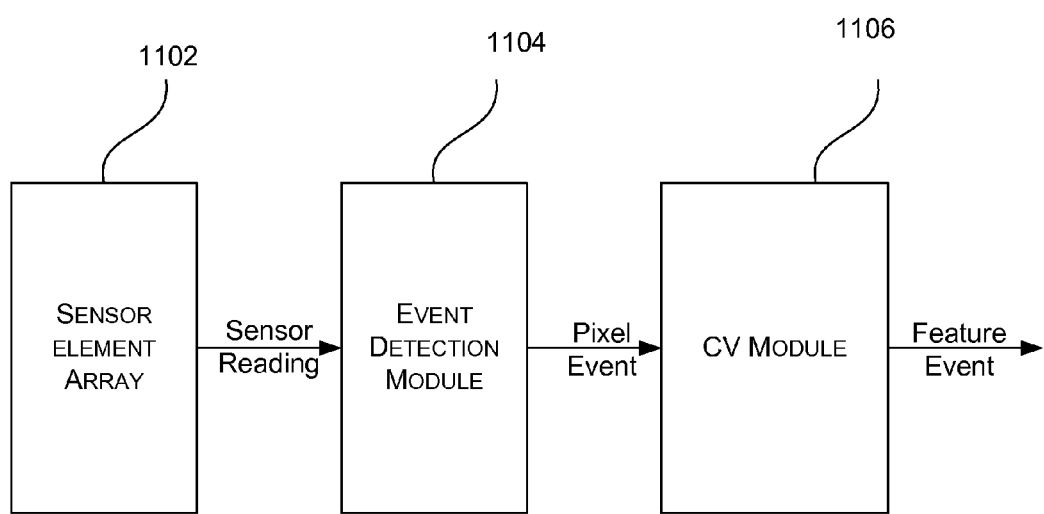
FIG. 11 illustrates an example block diagram for a sensing apparatus for computing computer vision (CV) features in in-pixel or peripheral circuitry.
Figure 12:
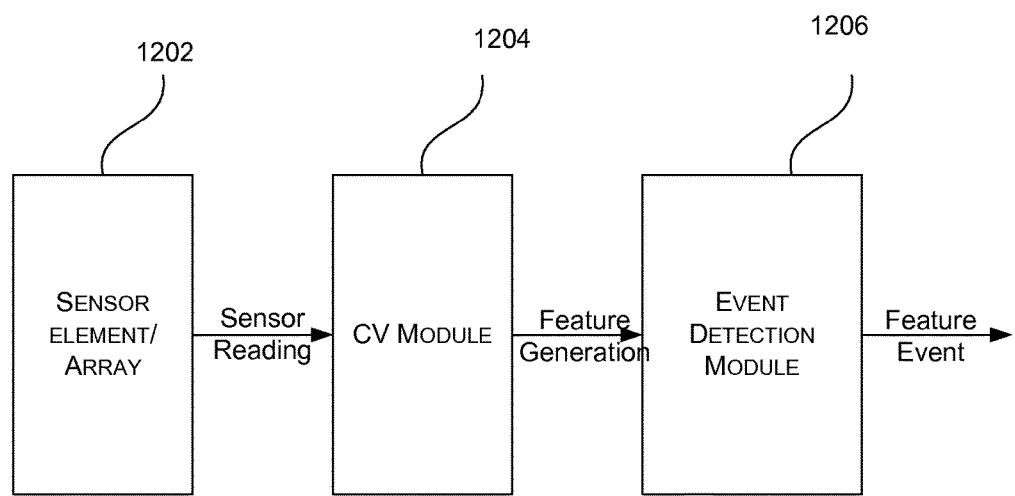
FIG. 12 illustrates another example block diagram for a sensing apparatus for computing CV features in the in-pixel or peripheral circuitry.

FIG. 11 and FIG. 12 illustrate two example implementations of computer vision operations in an event-based sensor. Although FIGS. 11 and 12 illustrate an event-based camera, a similar implementation is also possible for frame-based cameras without deviating from the scope of the invention.

FIG. 11 illustrates an example block diagram for a sensing apparatus performing computer vision operations in in-pixel circuitry or peripheral circuitry. FIG. 11 illustrates a sensor 1102, dynamic vision sensor (DVS) module 1104 and CV module 1106. As shown in FIG. 11, after generating a sensor reading from the sensor 1102, the DVS module 1104 may detect an event based on the change detected in the sensor reading. Once an event is detected, the CV module may perform CV operations and detect an event on a feature level granularity. In some instances, upon detection of a feature, the CV module may send the information to a processor for further processing.

The sensor 1102, DVS module 1104 and CV module 1106 may be implemented in various different configurations at various different granularities. For example, the sensor in FIG. 11 may represent a single sensor element, such as sensor element 102 in FIG. 1, or the entire sensor element array, such as sensor 100 in FIG. 1. The sensor reading from the sensor 1102 is continually sent to the DVS module 1104.

The DVS module 1104 may be implemented as in-pixel circuitry or peripheral circuitry or any combination thereof. In configurations where the DVS module 1104 processes sensor readings for a plurality of pixels, the DVS module 704 may process sensor readings from sensor elements associated with one dimension of the sensor element array, such as a column (also referred to as column parallel DVS) or the entire sensor element array. The DVS module 1104 may continually compare the sensor readings, such as voltage intensity for a sensor element against its previous stored analog readings. If the difference or change in the voltage intensity is beyond a pre-determined threshold, the DVS module 1104 may raise an event to the CV module 1106. The event raised by the DVS module 1104 is at a pixel level granularity, as shown in FIG. 11.

Similarly, the CV module 1106 may be implemented as in-pixel circuitry inside each of the sensor pixels or as peripheral circuitry for processing sensor readings for a plurality of pixels, as on-chip sensor circuitry or any combination thereof. In configurations where the CV module 1106 processes sensor readings for a plurality of pixels, the CV module 1106 may process sensor readings from sensor elements associated with one dimension of the sensor element array, such as a column (also referred to as column parallel CV) or the entire sensor element array.

Although not shown, the CV module 1106 may be configured to perform analog or digital operations representative of a multi-pixel computation for a sensor element, based on sensor readings generated by neighboring sensor elements in proximity to the referenced sensor element.

The CV module 1106 may detect features such as edges and corners by generating HSG or LBP labels. Therefore, for each pixel event detected, the CV module may determine the current features associated with the changed pixels and output the values as a feature event, as shown in FIG. 11.

FIG. 12 illustrates another example block diagram for a sensing apparatus performing computer vision operations in in-pixel circuitry or peripheral circuitry. FIG. 12 illustrates a sensor 1202, CV module 1204 and DVS module 1206. In contrast to the apparatus described with reference to FIG. 11, the CV operations in FIG. 12 are performed prior to the DVS operations. As shown in FIG. 12, after generating a sensor reading from the sensor 1202 as analog readings, the CV module 1204 may process the voltage to enable detection of a feature and pass the information to the DVS module 1206. The DVS module 1206 may consequently detect an event at a feature granularity (as opposed to an event at a pixel granularity). In some instances, upon detection of a feature, the CV module may send the information to a processor for further processing.

The sensor 1202, CV module 1204 and the DVS 1206 module may be implemented in various different configurations at various different granularities. For example, the sensor in FIG. 12 may represent a single sensor element, such as sensor element 1202 from FIG. 1, or the entire sensor element array, such as sensor 100 from FIG. 1.

The CV module 1204 may be implemented as in-pixel circuitry inside each of the sensor pixels or as peripheral circuitry for processing sensor readings for a plurality of pixels as an on-chip sensor module. In configurations where the CV module 1204 processes sensor readings for a plurality of pixels, the CV module 1204 may process sensor readings from sensor elements associated with one dimension of the sensor element array, such as a column (also referred to as column parallel CV) or the entire sensor element array.

Although not shown, the CV module 1204 may be configured to perform analog and digital operations representative of a multi-pixel computation for a pixel, based on sensor readings generated by neighboring sensor elements in proximity to the referenced pixel.

Similarly, the DVS module 1206 may be implemented as in-pixel circuitry inside each of the sensor pixels or as peripheral circuitry for processing sensor readings for a plurality of pixels as an on-chip sensor module. In configurations where the DVS module 1206 processes sensor readings for a plurality of pixels, the DVS module 1206 may process sensor readings from sensor elements associated with one dimension of the sensor element array, such as a column (also referred to as column parallel DVS) or the entire sensor element array.

In FIGS. 11 and 12, in addition to the in-pixel or peripheral circuitry or in alternative to them, the DVS and CV operations may be performed in a dedicated CV computation hardware. Furthermore, once a CV label indicating a CV feature is detected, the results may be sent to a dedicated microprocessor 404 for further processing and detection of one or macro-features.

Figure 13:
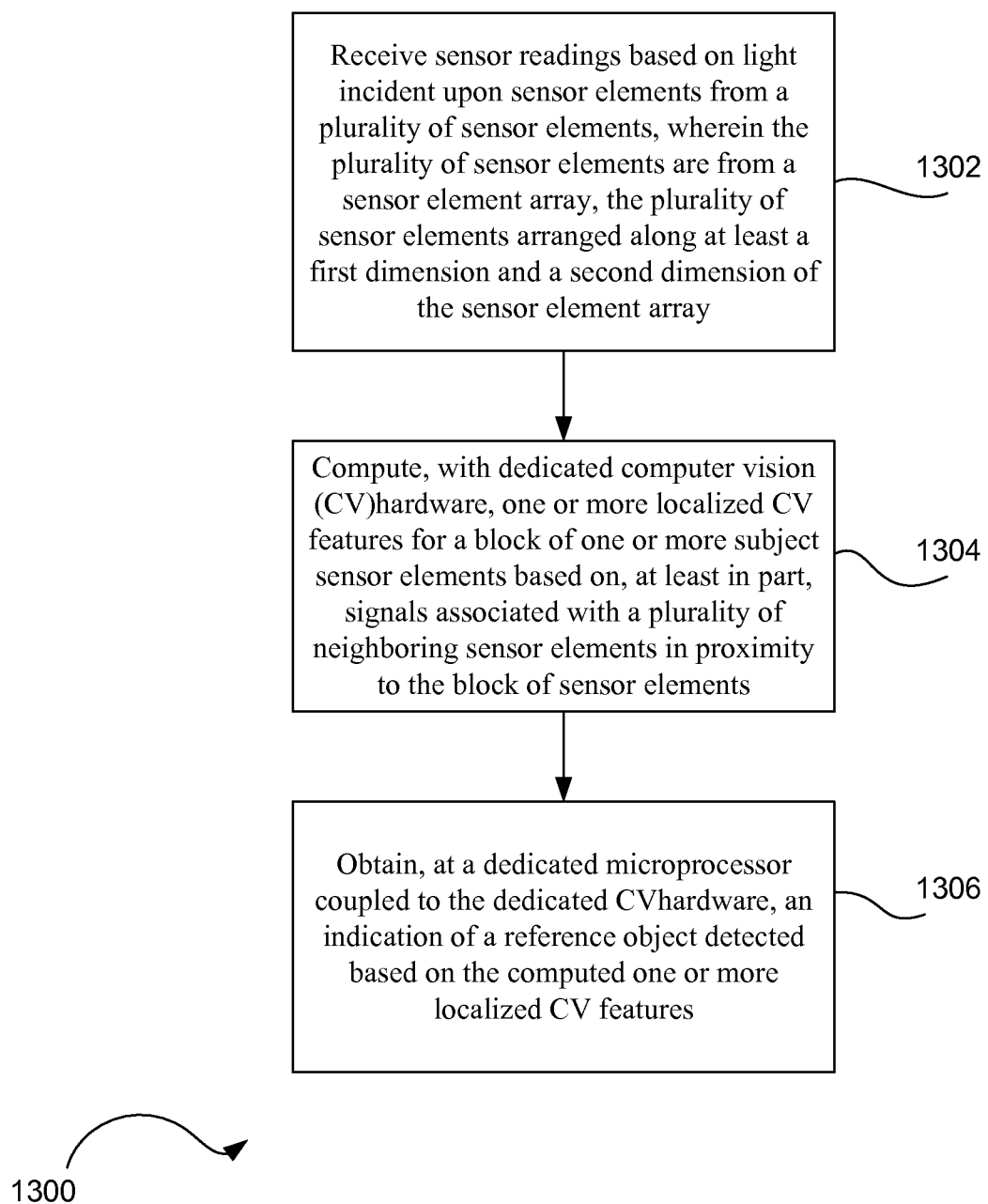
FIG. 13 is an example flowchart, according to certain aspects of the disclosure.

FIG. 13 is an example flowchart, according to certain aspects of the disclosure. Some or all of the process 1300 (or any other processes described herein, or variations and/or combinations thereof) may be performed by circuitry or logic. The circuitry or logic may be implemented in the in-pixel circuitry, peripheral circuitry, dedicated CV processing logic, or any combinations thereof. In some instances, all or portions of the logic may be implemented using instructions, executed on the digital circuitry and stored on a non-transitory computer-readable medium.

At block 1302, components, such as subject sensor elements, receive sensor readings based on light incident upon sensor elements from a plurality of sensor elements. In one implementation, the sensor readings are a voltage reading caused by the incident light upon the sensor element. In another implementation, the sensor reading is a change in the voltage beyond a threshold from a previous stored voltage value in a buffer or a capacitor.

The subject sensor element may be one from a plurality of sensor elements forming a sensor element array. The plurality of sensor elements may be arranged along at least a first dimension and a second dimension of the sensor element array, similar to the illustration of a sensor element array shown in FIG. 1.

At block 1304, components, such as a CV computation hardware, may compute one or more localized CV features for a block of one or more subject sensor elements based on, at least in part, signals associated with a plurality of neighboring sensor elements in proximity to the block of sensor elements.

A CV feature identifies or provides attributes associated with the sensor readings at any given point in time for a subject sensor element with respect to the sensor readings relatively close to the subject sensor element. CV features or localized CV features may refer to detecting low level computer vision markers or indicators, such as labels associated with each sensor element or pixel of the sensor. For example, a label may include a local binary pattern (LBP) label for a sensor element. An LBP label for a sensor element may be generated by comparing the sensor readings of the sensor element and some of its neighboring sensor elements. The sensor elements relatively close to the subject sensor element may be referred to as neighboring sensor elements. The plurality of neighboring sensor elements in proximity to the subject sensor element may include a two-dimensional patch in proximity to, or including, the subject sensor element. In certain aspects of the disclosure, the neighboring sensor elements may include sensor elements immediately adjacent to the subject sensor element. In certain other aspects of the disclosure, neighboring sensor elements may also include sensor elements that are relatively close to the subject sensor element and not immediately adjacent. For example, in certain instances, sensor elements within three sensor elements from the subject sensor element may still be considered neighboring sensor elements when the width or height of the number of sensors is sixty-four sensor elements. In certain implementations, CV features may be derived using labels, such as LBP labels.

At block 1306, components, such as a dedicated microprocessor 406 coupled to the dedicated CV microprocessor, obtain an indication of a reference object detected based on the computed one or more localized CV features. In certain instances, such an indication of the reference object may be received from the cascade classifier hardware 322 of FIG. 3B. For example, the cascade classifier hardware 322 may detect an object based on the computed one or more localized CV features. One example process of detecting macro-features and/or objects from CV features is described in more detail in FIG. 3B and FIG. 14C. Alternatively, or in addition, the indication may result from CV operations performed by dedicated microprocessor itself. In some such implementations, the dedicated microprocessor uses hardware-computed CV features from computer vision computation hardware 404 to perform CV operations such as object detection.

The dedicated microprocessor may be coupled to another processor external to the sensor apparatus through an interface. The interface may be wired or wireless. Wired interface may include, but is not limited to, SPI, I2C, or LVDS. For facilitating communication over a wireless interface, the dedicated microprocessor may be coupled to a wireless module and communicate wirelessly using Zigbee (IEEE 802.15.4 standard), Bluetooth®, body area network (IEEE 802.15.6), wireless USB, Wi-Fi (802.11), Z-wave, or IrDA (IR-based communications).

It should be appreciated that the specific steps illustrated in FIG. 13 provide a particular method of switching between modes of operation, according to one embodiment. Other sequences of steps may also be performed in alternate embodiments. For example, alternative embodiments may perform the steps/blocks outlined above in a different order. To illustrate, a user may choose to change from the third mode of operation to the first mode of operation, the fourth mode to the second mode, or any combination therebetween. Moreover, the individual steps/blocks illustrated in FIG. 13 may include multiple sub-steps that may be performed in various sequences as appropriate to the individual step. Furthermore, additional steps/blocks may be added or removed depending on the particular applications. One of ordinary skill in the art would recognize and appreciate many variations, modifications and alternatives of the process.

Figure 14A:
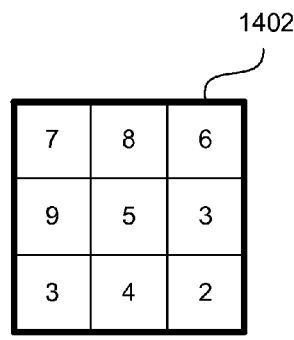
FIGS. 14A, 14B and 14C illustrate the process of converting the sensor readings from a plurality of sensor elements to CV features and performing higher level CV operations.
Figure 14B:
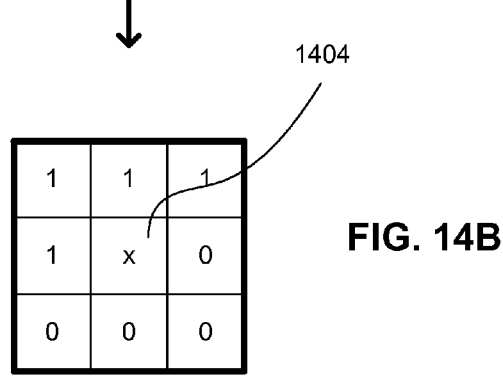
Figure 14C:
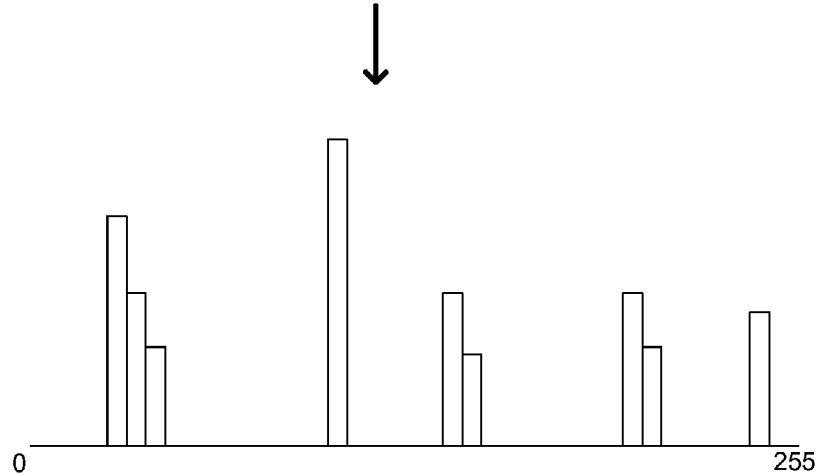

FIGS. 14A, 14B and 14C illustrate the process of converting the sensor readings from a plurality of sensor elements to CV features and then macro-features.

FIG. 14A illustrates a group of sensor readings (window 1402) from the plurality of sensor readings from FIG. 1 that are under consideration for generating an LBP label for a subject sensor element, for example, the sensor element with the value "5."

FIG. 14B illustrates the process of generating the binary threshold values for the center sensor element 1404 for generating an LBP label. The label generated for the center sensor element may be represented by the binary value 1111000. Each label may provide an indication of a CV feature from the perspective of the subject sensor element. The thresholding to generate the label may be repeated for signals corresponding to multiple subject sensor elements in the sensor array, the multiple subject sensor elements forming, for example, a sample window or subset of sensor elements of the sensor array. As mentioned in FIG. 1, the pixel-level LBP illustrated in FIG. 14B can be expanded to include multi-block LBP where the illustrated binary threshold values are generated for a block of one or more subject sensor elements by comparing a value corresponding to the block of one or more subject sensor elements, such a sum of the values associated with the one or more subject sensor elements in the block, to its neighboring sensor element blocks. Computations of the values corresponding to each of the blocks of sensor elements can be facilitated by computing an integral image. Similarly, it is understood that extensions of LBP may also be similarly computed, such as local ternary patterns (LTP), which provides three outputs depending on the difference between the subject sensor element and the neighboring sensor elements. For example, in one implementation of LTP, the output is one if the signal corresponding to the neighboring sensor element is greater than the signal corresponding to the subject sensor element plus a threshold, the output is zero if the signal corresponding to the neighboring sensor element is within the threshold compared to the signal corresponding to the subject sensor element, and the output is negative one if the signal corresponding to the neighboring sensor element is less than the signal corresponding to the subject sensor element minus the threshold.

FIG. 14C illustrates an example normalized histogram for a window, for example a window representing some subset of sensor elements from a sensor element array, generated from the plurality of labels for each of the sensor elements from the window. As shown in FIG. 14C, each of the LBP labels for the sensor readings in a sample window may fall anywhere on a histogram with, for example, 256 slots. So, for example, when comparing a subject sensor element to its eight neighbors, an 8 bit number will be generated meaning that 256 different LBP labels are possible. The histogram can represent the number of times each of the possible LBP labels were actually generated in the sample window. To determine if a face is present in the sample window, in one implementation, the generated histogram can be compared to a reference histogram of a face. An intersection between the generated histogram and the reference histogram can be computed, and a scalar sum generated from a summation of the intersection. If the scalar sum is greater than a threshold, then, to a given probability, a face is detected within the sample window. The reference histogram and the threshold are generally determined in a training phase using machine learning algorithms on a dataset of, in this example, sample faces and sample non-faces and their LBP histograms. Once the reference histogram and the threshold are determined in the training phase, for the same architecture, they can be programmed in, for example, the dedicated microprocessor 320 of FIG. 3B or dedicated microprocessor 406 of FIGS. 4A and 4B, or alternatively the above histogram process may be performed by dedicated hardware for computing a histogram for a given window within an image and determining whether a face, or other object, is present within the sample window.

Such a histogram may represent certain features identifying information about the plurality of sensor readings from the window 1402. The histogram may be analyzed based on statistics or heuristics for identifying or detecting reference-objects or macro-features, such as faces, smiles, objects, etc., from the plurality of sensor readings within image or sample window of the image. In some implementations, the histogram can be compared to a previously stored histogram.

It is to be noted, however, that the histogram from FIG. 14C is not drawn to scale or based on calculated values, and simply represents a visual illustration of a histogram. The generated histogram may be used for detecting macro-features for computer vision. For example, certain histogram patterns may represent smiles, faces, objects, etc.

In addition to the embodiments disclosed above additional embodiments are disclosed below for performing computer vision using rectangular features at arbitrary rotations and 1-D integrals. Such computations may be accomplished in the dedicated CV computation hardware in the in-pixel circuitry 204, in-peripheral circuitry or other dedicated digital logic disclosed above.

Computer Vision Using Rectangular Features at Arbitrary Rotations and 1-D Integrals Many existing CV algorithms require computing a sum or average of sensor readings from sensor elements within a specified rectangle within an image. Such computer vision algorithms may be used, for example, in face detection and other types of image-based tasks. Some solutions incorporate the use of integral images to accelerate certain computations. Implementations such as the original Viola-Jones algorithm require the rectangles to be aligned horizontally and/or vertically. These implementations have been extended to include diagonally aligned rectangles and rectangles aligned with integer ratios. However, these solutions are limited to specific diagonal alignments at fixed, predetermined angles. Accordingly, a need exists for CV computation techniques that can be efficiently carried out, without being limited to alignment at fixed, predetermined angles.

Additionally, methods, systems, computer-readable media, and apparatuses for efficiently computing a CV operation are presented. In some embodiments, an original image including a sensor element array including plurality of rows of sensor elements is received. A 1-D integral image-based on the received original image is computed. Each sensor element in the 1-D integral image has a sensor element value based on a corresponding sensor reading in the received original image and the value of all sensor elements to a particular direction in the same row of the sensor element in the corresponding received original image. A CV operation is performed corresponding to a shape having an arbitrary rotation superimposed over the original image by computing the CV operation on a row-by-row basis. For each row, the CV operation is computed based on a first end sensor element value from the 1-D integral image and a second end sensor element value from the 1-D integral image of the row.

Aspects of the disclosure use 1-dimensional integrals to allow computations for rectangles that are aligned at arbitrary angles. This may be useful to track faces or other objects in the image that may have an arbitrary alignment. A simple method of computing these integrals may be implemented in hardware.

In some embodiments, a method includes receiving an image. The method further includes accessing a sensor element array comprising a plurality of rows of sensor elements of the image. The method additionally includes sequentially determining sensor element values for each sensor element within one of the plurality of rows. The method further includes, simultaneous to determining the sensor element values for each sensor element, copying the sensor element values for each sensor element within the row to a first buffer. The method additionally includes adding the sensor element values in the first buffer to a previous summation of sensor element values, wherein the previous summation of sensor element values represents the sum of sensor element values for each of the plurality of rows before the row in the sensor element array.

In some embodiments, the previous summation of sensor element values is stored in a second buffer. In some embodiments, each of the plurality of rows comprises a plurality of cells, and wherein each of the plurality of cells comprises a sensor element value. In some embodiments, the adding step is performed until sensor element values for each sensor element within each of the rows of sensor elements has been determined. In some embodiments, the method also includes calculating an integral image of the received image based at least in part on the adding step. In some embodiments, the method also includes forwarding the integral image to a software application for further processing. In some embodiments, an apparatus includes a sensor element array comprising a plurality of rows of sensor elements of an image, a buffer, an adder circuit, and a processor. The processor is configured to sequentially determine sensor element values for each sensor element within one of the plurality of rows. The processor is also configured to, simultaneous to determining the sensor element values for each sensor element, copy the sensor element values for each sensor element within the row to a buffer. The processor is further configured to add, via the adder circuit, the sensor element values in the buffer to a previous summation of sensor element values, wherein the previous summation of sensor element values represents the sum of sensor element values for each of the plurality of rows before the row in the sensor element array.

In some embodiments, a method for efficiently computing a CV operation includes receiving an original image comprising a sensor element array comprising a plurality of rows of sensor elements. The method also includes computing a 1-D integral image based on the received original image, wherein each sensor element in the 1-D integral image has a sensor element value based on a corresponding sensor element value in the received original image and the value of all sensor elements to a particular direction in the same row of the sensor element in the corresponding received original image. The method additionally includes performing a CV operation corresponding to a shape having an arbitrary rotation superimposed over the original image by computing the CV operation on a row-by-row basis, wherein for each row a CV operation is computed based on a first end sensor element value from the 1-D integral image and a second end sensor element value from the 1-D integral image of the row.

In some embodiments, the shape is a rectangle. In some embodiments, the first end is a leftmost edge within a boundary of the shape and the second end is a rightmost edge within the boundary of the shape.

Certain example methods may include receiving an image, accessing a sensor element array comprising a plurality of rows of sensor elements of the image, copying sensor element values for a row from the plurality of rows into a corresponding row in a first buffer, and writing sensor element values to a second buffer, wherein each sensor element value in the second buffer is equal to the sum of a corresponding sensor element value in the first buffer and all sensor element values preceding the corresponding sensor element value in the first buffer. Calculating an integral image of the received image may be based at least in part on the writing step. The integral image may be forwarded to a software application for further processing.

Certain sensor apparatus may include a sensor element array and a buffer, an adder circuit, and a processor for copying sensor readings for a row from the plurality of rows into a corresponding row in a first buffer, and write sensor element values to a second buffer, wherein each sensor reading value in the second buffer is equal to the sum of a corresponding sensor reading value in the first buffer and all sensor reading values preceding the corresponding sensor reading value in the first buffer.

Another example method for efficiently computing a CV operation may include receiving an original image comprising a sensor element array comprising a plurality of rows of sensor elements, computing a 1-D integral image based on the received original image, wherein each sensor element in the 1-D integral image has a sensor element value based on a corresponding sensor element value in the received original image and the value of all sensor elements to a particular direction in the same row of the sensor element in the corresponding received original image and performing a CV operation corresponding to a shape having an arbitrary rotation superimposed over the original image by computing the CV operation on a row-by-row basis, wherein for each row a CV operation is computed based on a first end sensor element value from the 1-D integral image and a second end sensor element value from the 1-D integral image of the row. The shape may be a rectangle. The first end may be a leftmost edge within a boundary of the shape and the second end may be a rightmost edge within the boundary of the shape.

FIGS. 15A and 15B illustrate an existing method for face detection using Haar-like features. The figures illustrated in FIGS. 15A and 15B may use the Viola-Jones Algorithm and Haar-like features to detect a face within an image.

A Haar-like feature considers adjacent rectangular regions at a specific location in a detection window within the image, sums up the sensor element intensities in each region and calculates the difference between these sums. A simple rectangular Haar-like feature can be defined as the difference of the sum of sensor elements of areas inside the rectangle, which can be at any position and scale within the original image. This difference is then used to categorize subsections of an image. For example, a common Haar-like feature for face detection is a set of two adjacent rectangles that lie above the eye and the cheek region. The position of these rectangles is defined relative to a detection window that acts like a bounding box to the target object (the face in this case). An example of two-adjacent rectangles is depicted in FIG. 15A. The number of sensor elements determined to be in the left "black" region may be multiplied by −1 and the number of sensor elements determined to be in the right "white" region may be multiplied by +1. These two numbers may then be summed together to obtain the sensor element value for the region of the image bounded by the window containing the adjacent rectangles. This may be repeated for each adjacent rectangle pair within the window, or in some cases within sub-windows of the window.

In the detection phase of the Viola-Jones algorithm, a window of the target size is moved over the input image, and for each subsection of the image the Haar-like feature is calculated. The difference is then compared to a learned threshold that separates non-objects from objects. Because such a Haar-like feature is only a weak learner or classifier (its detection quality is slightly better than random guessing) a large number of Haar-like features are necessary to describe an object with sufficient accuracy. Accordingly, in the Viola-Jones algorithm, the Haar-like features are organized in something called a classifier cascade to form a strong learner or classifier. However, the Viola-Jones algorithm makes use of a 2-D integral and rectangles having arbitrary angles cannot be computed as efficiently as aligned rectangles.

Various adjacent rectangles that can be used by the Viola-Jones algorithm are depicted in FIG. 15B. For example, adjacent rectangles may be used to detect edge features in an image (e.g., 1a, 1b, 1c, 1d). In another example, a plurality of adjacent rectangles may be used to detect line features in an image (e.g., 2a, 2b, 2c, 2d, 2e, 2f, 2g, 2h). In yet another example, a rectangle contained within a rectangle can be used to detect center-surround features in an image (e.g., 3a, 3b). In yet another example, a plurality of rectangles can be arranged to detect special diagonal line features in an image (e.g., 4).

However, as can be seen in the image, each of the windows containing the rectangles is aligned at a predetermined angle (e.g., 90 degrees or 45 degrees). The windows containing the rectangles are not rotated at arbitrary angles. As mentioned above, the existing Viola-Jones algorithm may not be able to efficiently detect features if the rectangles were rotated at arbitrary angles.

Figure 16A:
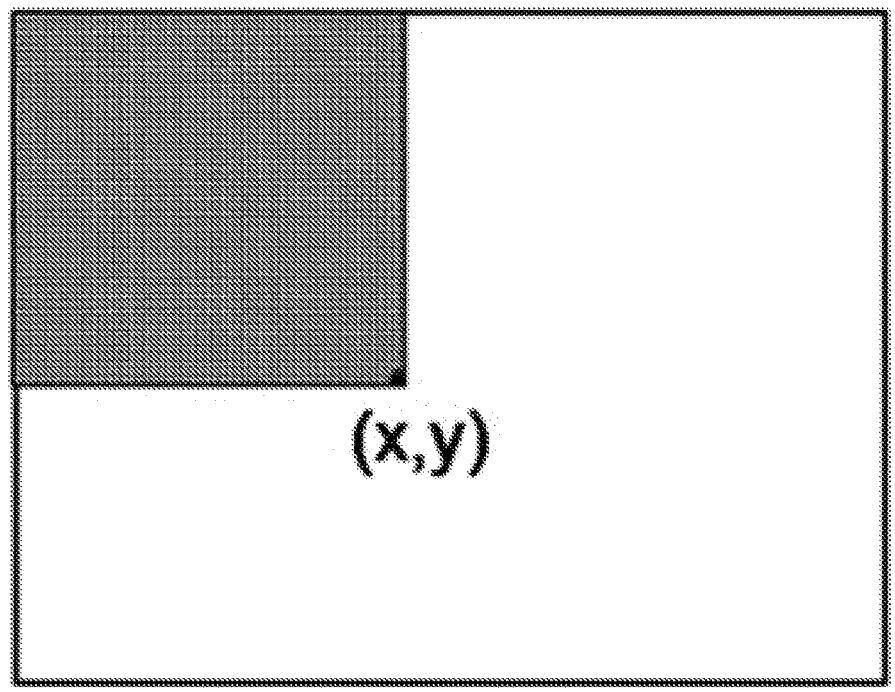
FIGS. 16A and 16B illustrate an example of an existing method of computing a 2-D integral over an image.
Figure 16B:
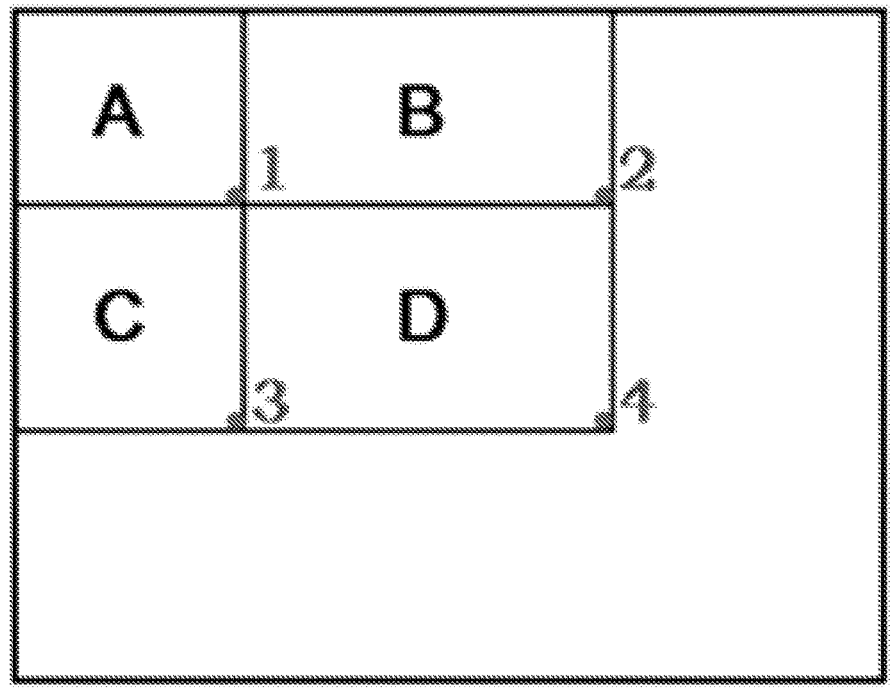

FIGS. 16A and 16B illustrate an example of an existing method of computing a 2-D integral over an image. The summation of the number of sensor elements in the rectangles described above with respect to FIGS. 15A and 15B can be inefficient due to the vast number of computations required. The use of a 2-D integral may allow for more efficient computations in determining the sensor element value for the region of the image bounded by the window containing the adjacent rectangles. As shown in FIG. 16A, for any given x-y coordinate, the number of sensor elements in the range from the top and left of the x-y coordinate can be summed (illustrated by the shaded region). This sum of the sensor element values in this region can be retained for computational efficiency, illustrated by the example in FIG. 16B. In FIG. 16B, four different sub-windows exist within the window. Each of these sub-windows may contain a plurality of adjacent rectangles. Additionally, x-y coordinates are illustrated in the figure (e.g., 1, 2, 3, and 4). However, prior computations of sub-windows may be reused for future computations of other sub-windows.

For example, the sum of the sensor elements of sub-window "D" can be computed by subtracting the value of x-y coordinate 2 and x-y coordinate 3 from x-y coordinate 4, and then adding x-y coordinate 1 to x-y coordinate 4. In other words: Sum('D')=Value('4')−Value('2')−Value('3')+Value('1'). Accordingly, only four look-ups are required to determine the sum of the sensor elements of sub-window "D". This method of computation can improve computational efficiency as compared to the summation method described with respect to FIG. 15A and FIG. 15B, because summation for each individual feature is not required. However, this method may still not be able to efficiently detect features if the rectangles were rotated at arbitrary angles.

Figure 17A:
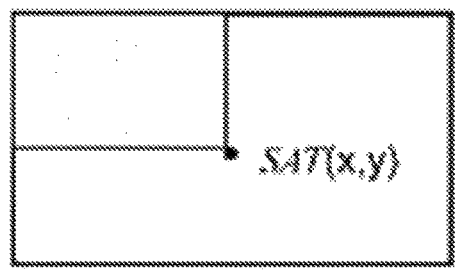
FIGS. 17A-17D illustrate an example of an existing method of computing a 2-D integral over rotated rectangles.
Figure 17B:
Figure 17C:
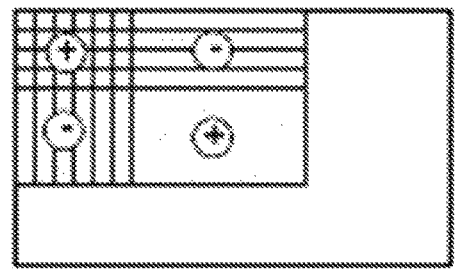
Figure 17D:
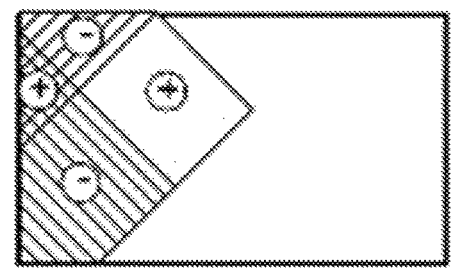

FIGS. 17A-17D illustrate an example of an existing method of computing a 2-D integral over rotated rectangles. Lienhart et al. has extended the integral image computation described with respect to FIGS. 17A and 17B to rotated rectangles (see Rainer Lienhart and Jochen Maydt, *An Extended Set of Haar-like Features for Rapid Object Detection*, 2002). FIG. 17A shows an upright summed area table (SAT) similar to what is shown in FIG. 16A. However, FIG. 17B illustrates a rotated summed area table (RSAT). In this example, the RSAT is a 45 degree rotated integral image. Performing the 2-D integral operation described in FIGS. 16A and 16B on the RSAT would compute the sum of the sensor element values in a rotated corner (e.g., TSAT (x,y)). FIG. 17C shows the calculation scheme of the sensor element sum of a traditional aligned rectangle, while FIG. 17D shows the calculation scheme of the sensor element sum of the rotated rectangle. The areas that are subtracted from the sensor element value at TSAT (x,y) are illustrated by a "−" sign and the areas that are added to the sensor element value at TSAT (x,y) are illustrated by a "+" sign.

This method may provide a richer set of Haar-like features to compute. However, the angles are predetermined and thus, the method may still struggle to efficiently compute rectangles having arbitrary rotation angles. Further, angle of rotation may need to be predetermined (e.g., unit-integer rotation angles) in order for the existing solutions to work (see Chris Messom and Andre Barczak, *Fast and Efficient Rotated Haar-like Features using Rotated Integral Images*, 2006.

Computing Sensor Element Value Sums of Arbitrary Angles Using 1-D Integrals

Figure 18A:
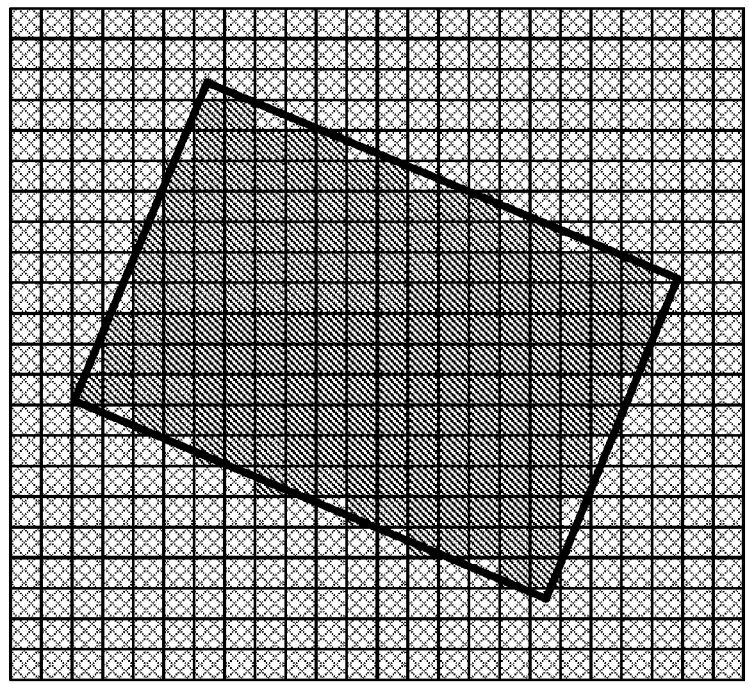
FIGS. 18A-18B illustrate using 1-D integrals for computing rectangle areas having arbitrary angles, in accordance with some implementations.
Figure 18B:
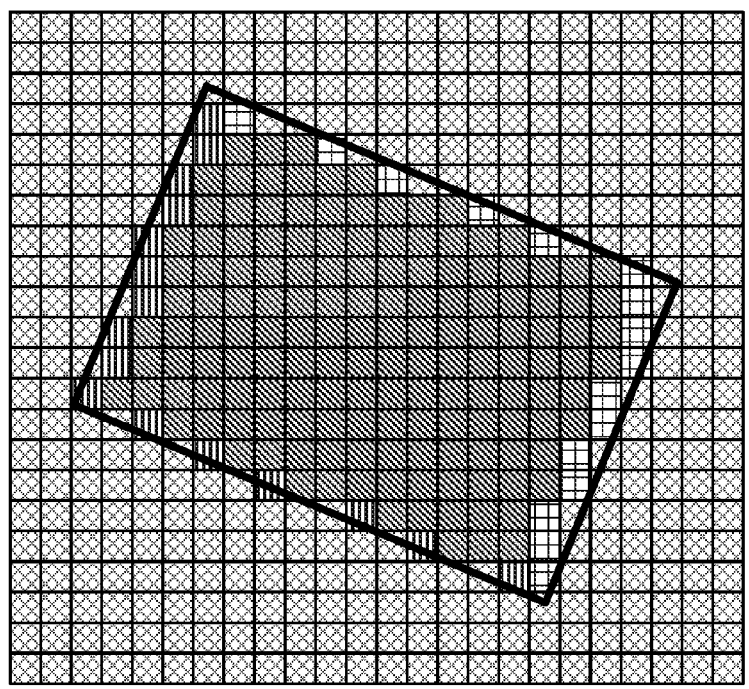

FIGS. 18A-18B illustrate using 1-D integrals for computing rectangle areas having arbitrary angles, in accordance with some implementations. As described above, the existing methods of simple summation or summation using 2-D integrals to compute arbitrary angles may not be as efficient as computing aligned rectangles. While some improvements have been made to compute the sensor element sum values for rectangles having a predetermined rotation, these methods still cannot efficiently compute sensor element sum values for rectangles having arbitrary angles. The use of 2-D integrals when the rectangles have an arbitrary rotation angle can result in thousands of angles, where each angle may need to be computed for the integral image.

However, the use of 1-D integrals for computing sensor element sum values for rectangles having an arbitrary rotation can be used for acceleration. Further, this method can be implemented in hardware. FIG. 18A shows a rectangle at an arbitrary rotation angle within a 1-D integral image. The 1-D integral image may be computed based on the original image. Once the 1-D integral image is computed, the rectangle (e.g., Haar-like feature template, or block for multi-block LBP) may be superimposed over the 1-D integral image. Each sensor element value for each sensor element in the integral image can include the sensor element value for the particular sensor element in addition to sensor element values for each sensor element to the left of the particular sensor element, within the same row. In order to compute the sum of the sensor element values for the sensor elements within the rectangle (indicated by shaded sensor elements), the sum of sensor element values corresponding to the rectangle for each row can be determined (illustrated in FIG. 18B). The sensor element value sum for each row can be determined by subtracting the sensor element value of the leftmost sensor element of the row within the rectangle from the sensor element value of the rightmost sensor element of the row within the rectangle. This computation would result in the sum of sensor element values for all the sensor elements in the particular row that are within the rectangle. Essentially, the "borders" of the rectangle for each row are used to determine the sensor element sum value for the entire row. This can be done for both horizontal sensor element lines and vertical sensor element lines. Each new sensor element value is added to the previous result of sensor element values to the left of the particular sensor element in the same row. While the number of lookups required may increase relative to a two dimensional integral image, the method may still be more computationally efficient because all of the image values do not need to be individually summed up.

FIG. 19 illustrates computation of 1-D integral images in hardware, in accordance with some implementations. The hardware shown depicts a sensor element array (labeled "Pixel Array"), a readout buffer and an integral calculation buffer. The voltage values from each row in the sensor element array may be read out into the readout buffer. For example, the voltage values of row N are read out into the readout buffer. Each sensor element in the row can be read out from left to right (or right to left) and sent to the readout buffer in a rasterized fashion. Each sensor element value can be sent to the readout buffer and then the process may repeat for the next row N+1.

It can be appreciated that implementation allows direct readout of the integral image from the camera sensor by serially reading out all of the sensor elements in the image in a rasterized fashion. Each new sensor element value received by the readout buffer can be added to the prior sensor element sum values of previously read out sensor elements in the same row by the integral calculation buffer to obtain the integral image.

The integral image may then be sent to hardware (such as scanning window array 318 or CV computation hardware 312 of FIG. 3B) for storage or for use in CV computations. Alternatively or additionally, the one dimensional integral image can be sent to software which can determine which rectangle it wants to evaluate based on the received integral image. It can be appreciated that computing the integral image in hardware provides advantages (such as efficiency) over computing the integral image in software. It can also be appreciated that this method may be able to effectively compute any rectangles at arbitrary angles, and may not require a table of predetermined rotation angles. Additionally, this method can provide more refined angles of the rectangles rather than having to rely on the pre-determined angles of the rectangles. Ultimately, this can result in improved face detection and other CV applications.

Figure 20:
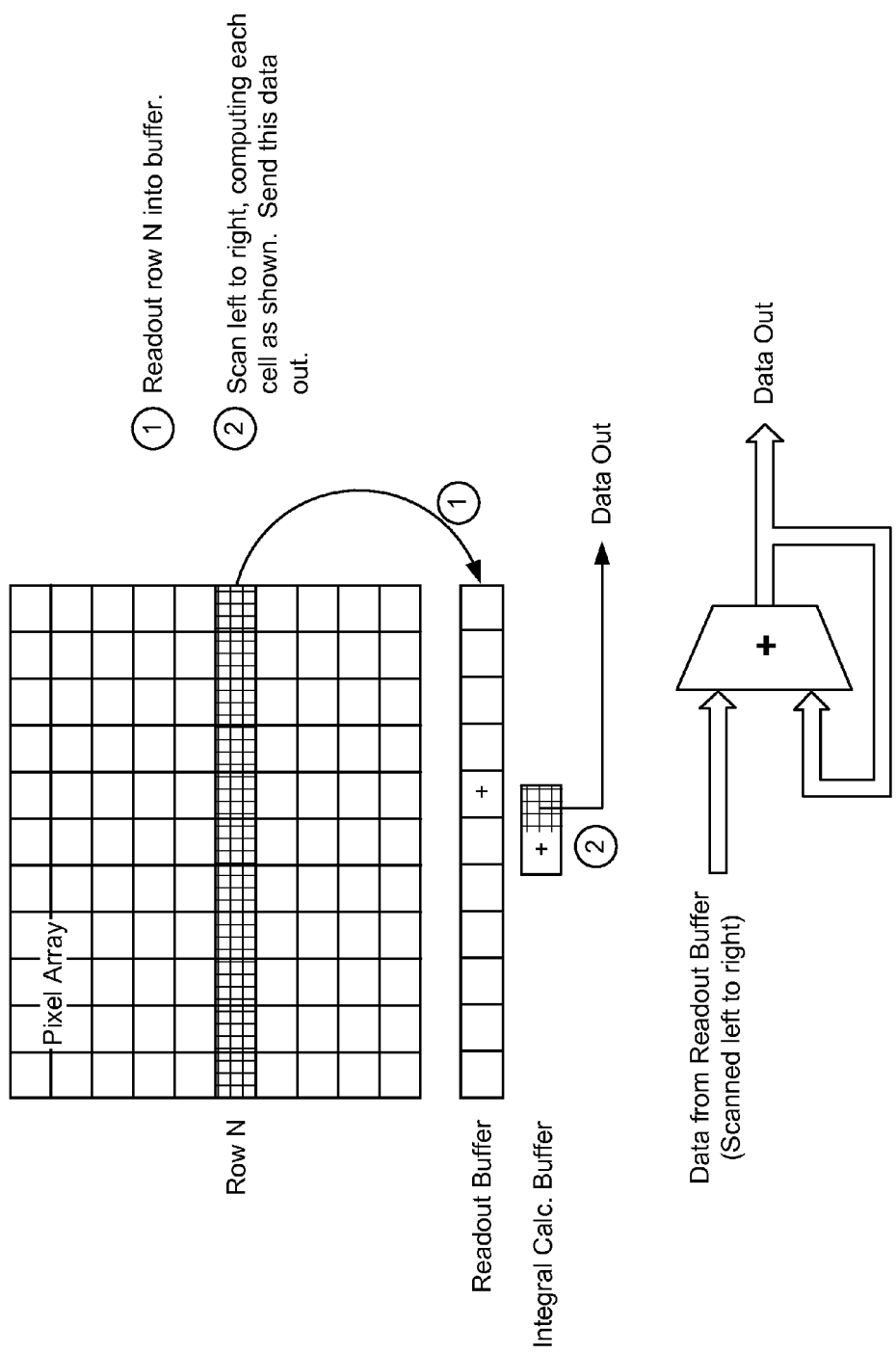
FIG. 20 illustrates the hardware implementation for computing 1-D integrals, in accordance with some implementations.

FIG. 20 illustrates the hardware implementation for computing 1-D integrals, in accordance with some implementations. The hardware implementation includes the sensor element array (labeled "Pixel Array"), readout buffer, and integral calculation buffer shown in FIG. 19. Additionally, the hardware implementation includes an adder circuit (e.g., 8-bit adder circuit). After the row of sensor elements is read out into the readout buffer (e.g., row N) sensor element-by-sensor element, as described with respect to FIG. 19, the "data out" can be input into the adder circuit (left to right). The adder circuit adds the input "data out" from the readout buffer to the previous "data out" from the adder circuit. The result of the addition may then be the new "data out". Accordingly, the "data out" from the adder circuit can be the present summation of the sensor element values for row N read out up to that point. The "data out" from the adder circuit can then be stored in the integral calculation buffer. This process may continue until read out of all sensor elements in row N has been exhausted. In some implementations, the "data out" may be stored into, for example, the scanning window array 318 of FIG. 3B.

Figure 21:
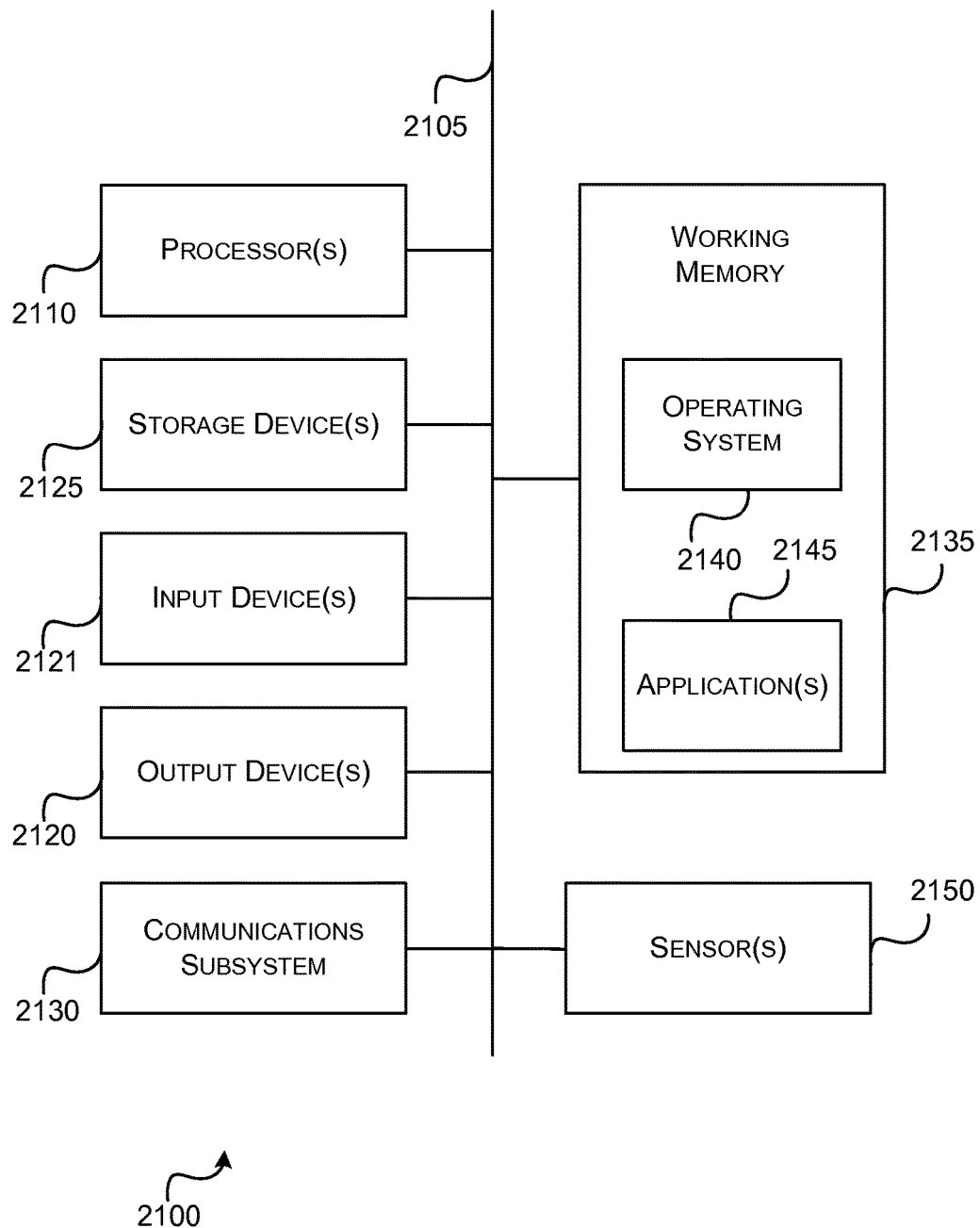
FIG. 21 illustrates an example of a computing system in which one or more embodiments may be implemented.

FIG. 21 illustrates an example computing device incorporating parts of the device and sensor 100 employed in practicing embodiments of the invention. For example, computing device 2100 may represent some of the components of a mobile device or any other computing device. Examples of a computing device 2100 include, but are not limited to, desktops, workstations, personal computers, supercomputers, video game consoles, tablets, smart phones, laptops, netbooks, or other portable devices. FIG. 21 provides a schematic illustration of one embodiment of a computing device 2100 that may perform the methods provided by various other embodiments, as described herein, and/or may function as the host computing device, a remote kiosk/terminal, a point-of-sale device, a mobile multifunction device, a set-top box and/or a computing device. FIG. 21 is meant only to provide a generalized illustration of various components, any or all of which may be utilized as appropriate. FIG. 21, therefore, broadly illustrates how individual system elements may be implemented in a relatively separated or relatively more integrated manner.

The computing device 2100 is shown comprising hardware elements that may be electrically coupled via a bus 2105 (or may otherwise be in communication, as appropriate). The hardware elements may include one or more processors 2110, including, without limitation, one or more general-purpose processors and/or one or more special-purpose processors (such as digital signal processing chips, graphics acceleration processors, and/or the like); one or more input devices 2115, which may include, without limitation, one or more cameras sensors 2150, a mouse, a keyboard and/or the like; and one or more output devices 2120, which may include, without limitation, a display unit, a printer and/or the like. Sensors 2150 module may include vision sensors, olfactory sensors and/or chemical sensors. In some implementations, sensor 2150 may correspond to the sensor element array described with reference to FIGS. 1, 3A, 3B, 4A, 4B, 5, 6, 11, and 12.

The computing device 2100 may further include (and/or be in communication with) one or more non-transitory storage devices 2125, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including, without limitation, various file systems, database structures, and/or the like.

The computing device 2100 might also include a communications subsystem 2130. The communications subsystem 2130 may include a transceiver for receiving and transmitting data or a wired and/or wireless medium. The communications subsystem 2130 may also include, without limitation, a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 2130 may permit data to be exchanged with a network (such as the network described below, to name one example), other computing devices, and/or any other devices described herein. In many embodiments, the computing device 2100 will further comprise a non-transitory working memory 2135, which may include a Random Access Memory (RAM) or Read Only Memory (ROM) device, as described above.

The computing device 2100 may comprise software elements, shown as being currently located within the working memory 2135, including an operating system 2140, device drivers, executable libraries, and/or other code, such as one or more application programs 2145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 2125 described above. In some cases, the storage medium might be incorporated within a computing device, such as computing device 2100. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 2100 and/or might take the form of source and/or installable code, which, upon compilation and/or installation on the computing device 2100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 2100 such as network input/output devices may be employed.

Some embodiments may employ a computing device (such as the computing device 2100) to perform methods in accordance with the disclosure. For example, some or all of the procedures of the described methods may be performed by the computing device 2100 in response to processor 2110 executing one or more sequences of one or more instructions (which might be incorporated into the operating system 2140 and/or other code, such as an application program 2145) contained in the working memory 2135. Such instructions may be read into the working memory 2135 from another computer-readable medium, such as one or more of the storage device(s) 2125. Merely by way of example, execution of the sequences of instructions contained in the working memory 2135 might cause the processor(s) 2110 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 2100, various computer-readable media might be involved in providing instructions/code to processor(s) 2110 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 2125. Volatile media include, without limitation, dynamic memory, such as the working memory 2135. Transmission media include, without limitation, coaxial cables, copper wire and fiber optics, including the wires that comprise the bus 2105, as well as the various components of the communications subsystem 2130 (and/or the media by which the communications subsystem 2130 provides communication with other devices). Hence, transmission media may also take the form of waves (including, without limitation, radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a Compact Disc-Read Only Memory (CD-ROM), any other optical medium, punchcards, papertape, any other physical medium with patterns of holes, a Random Access Memory (RAM), a Programmable Read Only Memory (PROM), Erasable Programmable-Read Only Memory (EPROM), a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 2110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 2100. These signals, which might be in the form of electromagnetic signals, acoustic signals, optical signals and/or the like, are all examples of carrier waves on which instructions may be encoded, in accordance with various embodiments of the invention.

The communications subsystem 2130 (and/or components thereof) generally will receive the signals, and the bus 2105 then might carry the signals (and/or the data, instructions, etc., carried by the signals) to the working memory 2135, from which the processor(s) 2110 retrieves and executes the instructions. The instructions received by the working memory 2135 may optionally be stored on a non-transitory storage device 2125 either before or after execution by the processor(s) 2110.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A vision sensor comprising:
 a sensor element array comprising a plurality of sensor elements, the plurality of sensor elements arranged along at least a first dimension and a second dimension of the sensor element array, each of the plurality of sensor elements capable of generating a signal based on light incident upon the plurality of sensor elements, the signals corresponding to the plurality of sensor elements representing an image;
 dedicated computer vision (CV) computation hardware configured to compute a localized CV feature for a block of one or more subject sensor elements based on, at least in part, signals associated with a plurality of neighboring sensor elements in proximity to the block of the one or more subject sensor elements;
 integration hardware for computation of combinations, sums, or averages of signals corresponding to blocks of sensor elements corresponding to a subset of the signals representing the image, wherein the dedicated CV computation hardware has access to the computed combinations, sums, or averages; and
 a dedicated microprocessor coupled to the dedicated CV computation hardware, wherein the dedicated microprocessor includes an interface for communication with a second microprocessor.

2. The vision sensor of claim 1, wherein the interface for communication with the second microprocessor uses one of serial peripheral interface (SPI), Inter-Integrated Circuit (I2C), or low voltage differential signaling (LVDS).

3. The vision sensor of claim 1, wherein a mobile device comprises the vision sensor and the second microprocessor, wherein the dedicated microprocessor is coupled to the second microprocessor through a wired interface, and wherein the second microprocessor is a higher power processor than the dedicated microprocessor.

4. The vision sensor of claim 1, further comprising a wireless module for communication with the second microprocessor, wherein the wireless module for communication with the second microprocessor is coupled to the dedicated microprocessor using the interface for communication with the second microprocessor.

5. The vision sensor of claim 4, wherein the wireless module is configured to communicate using a Zigbee (IEEE 802.15.4 standard), Bluetooth®, body area network (IEEE 802.15.6), wireless USB, Wi-Fi (802.11), Z-wave, or IrDA (IR-based communications).

6. The vision sensor of claim 1, wherein the block of one or more subject sensor elements for which the localized CV feature is computed is a single subject sensor element.

7. The vision sensor of claim 1, wherein the dedicated CV computation hardware computes a local binary pattern (LBP) label.

8. The vision sensor of claim 7, wherein the integration hardware is capable of computing an integral image of the image.

9. The vision sensor of claim 8, wherein the CV computation hardware is coupled to cascade classifier hardware configured to detect a presence or an absence of a reference object in the window of the image.

10. The vision sensor of claim 9, wherein the dedicated microprocessor is configured to receive an indication of the presence of the reference object when the presence of the reference object is detected.

11. The vision sensor of claim 1, wherein the dedicated microprocessor is configured to detect a presence or an absence of a reference object in a window of the image based on localized CV features received from the dedicated CV computation hardware.

12. The vision sensor of claim 1, wherein the dedicated CV computation hardware computes a histogram of signed gradients (HSG) feature.

13. The vision sensor of claim 1, wherein the localized CV features correspond to one or more of a spot, an edge, or a corner of a line edge.

14. The vision sensor of claim 1, wherein the sensor element array and the CV computation hardware are connected without intervening image signal processing circuitry.

15. The vision sensor of claim 14, wherein the signals received by the CV computation hardware from the sensor element array have not undergone one or more of defect correction, white balancing, color balancing, autofocus, lens roll off, demosaicing, debayering, and/or image sharpening.

16. A method comprising:
receiving, at a vision sensor, sensor readings based on light incident upon sensor elements from a plurality of sensor elements of the sensor element array the plurality of sensor elements arranged along at least a first dimension and a second dimension of the sensor element array and each capable of generating a signal based on light incident upon the plurality of sensor elements, the signals corresponding to the plurality of sensor elements representing an image;
computing, with dedicated computer vision (CV) hardware of the vision sensor, one or more localized CV features for a block of one or more subject sensor elements based on, at least in part, signals associated with a plurality of neighboring sensor elements in proximity to the block of the one or more sensor elements;
computing, with integration hardware of the vision sensor, combinations, sums, or averages of signals corresponding to blocks of sensor elements corresponding to a subset of the signals representing the image, wherein the dedicated CV computation hardware has access to the computed combinations, sums, or averages; and
generating, at a dedicated microprocessor of the vision sensor that is coupled to the dedicated CV hardware, an indication of a reference object detected based on the computed one or more localized CV features.

17. The method of claim 16, wherein the dedicated microprocessor includes an interface for communication with a second microprocessor.

18. The method of claim 16, wherein the interface is one of a wired interface or wireless interface.

19. The method of claim 18, further comprising sending, from the dedicated microprocessor, a signal to the second microprocessor based on the indication of the reference object detected.

20. A vision sensor comprising:
means for receiving sensor readings based on light incident upon sensor elements from a plurality of sensor elements of the sensor element array the plurality of sensor elements arranged along at least a first dimension and a second dimension of the sensor element array and each capable of generating a signal based on light incident upon the plurality of sensor elements, the signals corresponding to the plurality of sensor elements representing an image;
means for computing one or more localized computer vision (CV) features based on sensor readings from at least neighboring sensor elements for each block of one or more of the sensor elements;
means for computing combinations, sums, or averages of signals corresponding to blocks of sensor elements corresponding to a subset of the signals representing the image, wherein the dedicated CV computation hardware has access to the computed combinations, sums, or averages;
means for generating an indication of a reference object based on the computed one or more localized CV features; and
means for communicating the indication of the reference object to a second microprocessor.

21. The vision sensor of claim 20, wherein the means for computing a localized CV feature comprises means for computing a local binary pattern (LBP) label.

22. The vision sensor of claim 20, wherein the means for computing a localized CV feature comprises means for computing a histogram of signed gradients (HSG) label.

23. The vision sensor of claim 20, wherein the localized CV features correspond to one or more of a spot, an edge, or a corner of a line edge.

24. A vision sensor comprising a non-transitory computer-readable storage medium, wherein the non-transitory computer-readable storage medium comprises instructions executable by a dedicated computer vision (CV) microprocessor for:
controlling a sensor element array for generating sensor readings based on light incident upon sensor elements from a plurality of sensor elements of the sensor element array the plurality of sensor elements arranged along at least a first dimension and a second dimension of the sensor element array;
controlling dedicated computer vision (CV) hardware for computing one or more localized CV features for a block of one or more subject sensor elements based on, at least in part, signals associated with a plurality of neighboring sensor elements in proximity to the block of the one or more sensor elements;
controlling integration hardware of the vision sensor for computing combinations, sums, or averages of signals corresponding to blocks of sensor elements corresponding to a subset of the signals representing the image, wherein the dedicated CV computation hardware has access to the computed combinations, sums, or averages; and
generating, at a dedicated microprocessor coupled to the dedicated CV hardware, an indication of a reference object detected based on the computed one or more localized CV features.

25. The non-transitory computer-readable storage medium of claim 24, further comprising instructions for controlling a communication interface for communication with a second microprocessor.

26. The non-transitory computer-readable storage medium of claim 25, wherein the communication interface comprises one of a wired interface or wireless interface.

27. The non-transitory computer-readable storage medium of claim 25, further comprising instructions for sending, from the dedicated microprocessor to the second microprocessor, the generated indication of the reference object detected.

* * * * *